(12) United States Patent
Fujimura et al.

(10) Patent No.: US 12,072,681 B2
(45) Date of Patent: Aug. 27, 2024

(54) SUPPORT DEVICE, NON-TRANSITORY COMPUTER-READABLE RECORDING MEDIUM RECORDING SUPPORT PROGRAM, AND SETTING METHOD

(71) Applicant: OMRON Corporation, Kyoto (JP)

(72) Inventors: Ryosuke Fujimura, Kyoto (JP); Asahi Matsui, Kyoto (JP); Toru Murata, Kyoto (JP); Yasuki Yoda, Kyoto (JP); Hiromu Suganuma, Kyoto (JP); Akio Kawaharada, Kyoto (JP)

(73) Assignee: OMRON Corporation, Kyoto (JP)

( * ) Notice: Subject to any disclaimer, the term of this patent is extended or adjusted under 35 U.S.C. 154(b) by 390 days.

(21) Appl. No.: 17/627,690

(22) PCT Filed: Mar. 9, 2020

(86) PCT No.: PCT/JP2020/009958
§ 371 (c)(1),
(2) Date: Jan. 17, 2022

(87) PCT Pub. No.: WO2021/038930
PCT Pub. Date: Mar. 4, 2021

(65) Prior Publication Data
US 2022/0244695 A1 Aug. 4, 2022

(30) Foreign Application Priority Data
Aug. 30, 2019 (JP) .................................. 2019-158509

(51) Int. Cl.
*G05B 19/042* (2006.01)
(52) U.S. Cl.
CPC ................................ *G05B 19/0425* (2013.01)
(58) Field of Classification Search
CPC .. G05B 19/0425; G05B 19/0428; H04L 12/12
(Continued)

(56) References Cited

U.S. PATENT DOCUMENTS

2005/0017875 A1* 1/2005 Nakayama ........... G05B 19/058
340/870.07
2012/0311413 A1* 12/2012 Pelletier ............... H04L 9/3271
714/E11.032
(Continued)

FOREIGN PATENT DOCUMENTS

CN 102857342 1/2013
CN 105340334 2/2016
(Continued)

OTHER PUBLICATIONS

Allen-Bradley, "User Manual POINT Guard I/O Safety Modules", Rockwell Automation Publication, Jul. 2014, pp. 1-211.
(Continued)

*Primary Examiner* — Chun Cao
(74) *Attorney, Agent, or Firm* — JCIPRNET

(57) ABSTRACT

In the present invention a control device and a safety device establish a connection in accordance with a result of a comparison of connection setting information stored in the control device and setting identification information stored in the safety device. A support device is provided with a processor for executing a support program for assisting in setting the control device. A support program includes a first command for acquiring the setting identification information from the safety device and a second command for setting, in the connection setting information corresponding to the safety device, the setting identification information acquired in response to execution of the first command. Thus, the required identification information can easily be set even when a plurality of safety devices are connected to the same network.

14 Claims, 11 Drawing Sheets

(58) Field of Classification Search
USPC .......................................................... 700/79
See application file for complete search history.

(56) References Cited

U.S. PATENT DOCUMENTS

2014/0019599 A1* 1/2014 Endou ................. H04L 12/4641
709/221
2019/0306029 A1* 10/2019 Kawaharada ...... G05B 19/4185

FOREIGN PATENT DOCUMENTS

| CN | 107040499 | 8/2017 |
|---|---|---|
| CN | 107171822 | 9/2017 |
| CN | 107852699 | 3/2018 |
| DE | 102012009494 | 11/2013 |
| EP | 3223148 | 9/2017 |
| EP | 3252550 | 12/2017 |
| JP | 2012209645 | 10/2012 |
| JP | 2013242629 | 12/2013 |
| JP | 2017142767 | 8/2017 |
| JP | 2019174950 | 10/2019 |
| JP | 2019179475 | 10/2019 |
| JP | 2019179476 | 10/2019 |

OTHER PUBLICATIONS

Allen-Bradley, "User Manual GuardLogix 5570 Controllers", Rockwell Automation Publication, May 2017, pp. 1-171.
"Search Report of Europe Counterpart Application", issued on Aug. 9, 2023, pp. 1-11.
ODVA, "The Common Industrial Protocol," Aug. 5, 2019, pp. 1-3, Available at: https://www.odva.org/Technology-Standards/Common-Industrial-Protocol-CIP/Overview.
"International Search Report (Form PCT/ISA/210) of PCT/JP2020/009958," mailed on Jun. 9, 2020, with English translation thereof, pp. 1-5.
"Written Opinion of the International Searching Authority (Form PCT/ISA/237)" of PCT/JP2020/009958, mailed on Jun. 9, 2020, with English translation thereof, pp. 1-9.
"Office Action of China Counterpart Application", issued on Feb. 18, 2024, with English translation thereof, pp. 1-11.

* cited by examiner

SUPPORT DEVICE, NON-TRANSITORY COMPUTER-READABLE RECORDING MEDIUM RECORDING SUPPORT PROGRAM, AND SETTING METHOD

CROSS-REFERENCE TO RELATED APPLICATION

This application is a 371 application of the International PCT application serial no. PCT/JP2020/009958, filed on Mar. 9, 2020, which claims the priority benefits of Japan Patent Application No. 2019-158509, filed on Aug. 30, 2019. The entirety of each of the above-mentioned patent applications is hereby incorporated by reference herein and made a part of this specification.

TECHNICAL FIELD

The present invention relates to a support device, a non-transitory computer-readable recording medium recording a support program, and a setting method.

RELATED ART

Conventionally, in the field of factory automation (FA), a system in which a control device and various devices such as a sensor, an actuator, and the like are network-connected has been used. With the development of information and communication technology (ICT), the application of more advanced communication technology is progressing.

For example, by using a network technology referred to as common industrial protocol (CIP) managed and provided by ODVA, Inc., which is headquartered in the United States, communication between control devices, and communication between a control device and an arbitrary device can be achieved (see Non-Patent Literature 1).

CITATION LIST

Patent Literature

Non-Patent Literature 1: ODVA, "The Common Industrial Protocol", [online], [searched on Aug. 5, 2019], the Internet <URL: https://www.odva.org/Technology-Standards/Common-Industrial-Protocol-CIP/Overview>

SUMMARY OF INVENTION

Technical Problem

In order to implement the communication using the advanced communication technology as described above, each control device and/or device connected to the same network is required to be appropriately set. On the other hand, multiple devices may be connected to the same network, and there is a problem that the setting operation is complicated and troublesome.

The present invention has been made in view of the above problem, and the purpose of the present invention is to provide a support device, a non-transitory computer-readable recording medium recording a support program, and a setting method capable of easily setting required identification information even when multiple safety devices are connected to the same network.

Solution to Problem

According to an example of the present invention, the support device is capable of communicating with a control device network-connected to one or a plurality of safety devices. Each of the one or plurality of safety devices holds setting identification information that identifies the setting of the own device. The control device holds, for each of the one or plurality of safety devices, connection setting information set for establishing a connection with the safety device. The one or plurality of safety devices include a target safety device for which a first establishment method has been set, wherein the first establishment method establish a connection with the control device in accordance with a result of a comparison between the connection setting information and the setting identification information. The support device includes a memory part for storing a support program that assists in the setting of the control device, and a processor for executing the support program. The support program includes a first command and a second command. The first command is a command for acquiring the setting identification information from the target safety device. The second command is a command for setting, in the connection setting information corresponding to the target safety device, the setting identification information acquired from the target safety device in response to the execution of the first command.

According to the invention, a user may activate the support program to execute the first command and the second command. Thereby, the setting identification information acquired from the target safety device is automatically set in the connection setting information held by the control device. Therefore, the user can save the trouble of activating a setting tool for the safety device and recording the setting identification information of the safety device on a memo paper or the like. As a result, even when multiple safety devices are connected to the same network, the user can easily set the setting identification information for identifying the setting of each of the multiple safety devices in the control device.

In the above invention, each of the one or plurality of safety devices holds device identification information that identifies the own device. The support program further includes a third command and a fourth command. The third command is a command for acquiring the device identification information from the target safety device. The fourth command is a command for comparing the device identification information acquired from the target safety device in response to the execution of the third command with first setting information held in association with the target safety device. The first command and the second command are executed according to the fact that a comparison result obtained by executing the fourth command shows a match. According to the invention, it is possible to suppress erroneous setting of connection setting information.

In the above invention, each of the one or plurality of safety devices holds attribute information representing the attribute of the own device. The support program further includes a fifth command and a sixth command. The fifth command is a command for acquiring the attribute information from the target safety device. The sixth command is a command for comparing the attribute information acquired from the target safety device in response to the execution of the fifth command with second setting information held in association with the target safety device. The first command and the second command are executed according to the fact that a comparison result obtained by executing the sixth command shows a match. According to the invention, it is possible to suppress erroneous setting of connection setting information.

In the above invention, the support device includes a user interface. The support program further includes a seventh command for setting either the first establishment method or a second establishment method for each of the one or plurality of safety devices according to the input to the user interface, wherein the second establishment method establishes a connection with the control device without using the setting identification information. The target safety device is a safety device for which the first establishment method has been set by executing the seventh command.

According to the invention, the first command is executed only for the safety device in which the setting identification information is required for establishing the connection. Thereby, unnecessary communication can be suppressed in the setting of the control device.

In the above invention, the support device includes a user interface. The support program further includes an eighth command for classifying, according to the input to the user interface, each of the one or plurality of safety devices into either a first group in which the connection setting information is automatically set or a second group in which the connection setting information is manually set. The target safety device is a safety device classified into the first group by executing the eighth command.

According to the invention, the first command is not executed for the safety device in which the connection setting information is manually set for the control device. Thereby, unnecessary communication can be suppressed in the setting of the control device.

According to an example of the present invention, the support program is executed by a computer capable of communicating with a control device network-connected to one or a plurality of safety devices and assists in the setting of the control device. Each of the one or plurality of safety devices holds setting identification information that identifies the setting of the own device. The control device holds, for each of the one or plurality of safety devices, connection setting information set for establishing a connection with the safety device. The one or plurality of safety devices include a target safety device for which a first establishment method has been set, wherein the first establishment method establishes a connection with the control device in accordance with a result of a comparison between the connection setting information and the setting identification information. The support program makes the computer execute a first step and a second step. The first step is a step of acquiring the setting identification information from the target safety device. The second step is a step of setting the setting identification information acquired from the target safety device in the connection setting information corresponding to the target safety device.

According to an example of the present invention, the setting method of a control device in a support device capable of communicating with the control device network-connected to one or a plurality of safety devices includes: a step in which the support device acquires the setting identification information from the target safety device; and a step in which the support device sets the setting identification information acquired from the target safety device in the connection setting information corresponding to the safety device.

Effects of Invention

According to the present invention, even when multiple safety devices are connected to the same network, the required identification information can be easily set.

DESCRIPTION OF EMBODIMENTS

Figure 1:
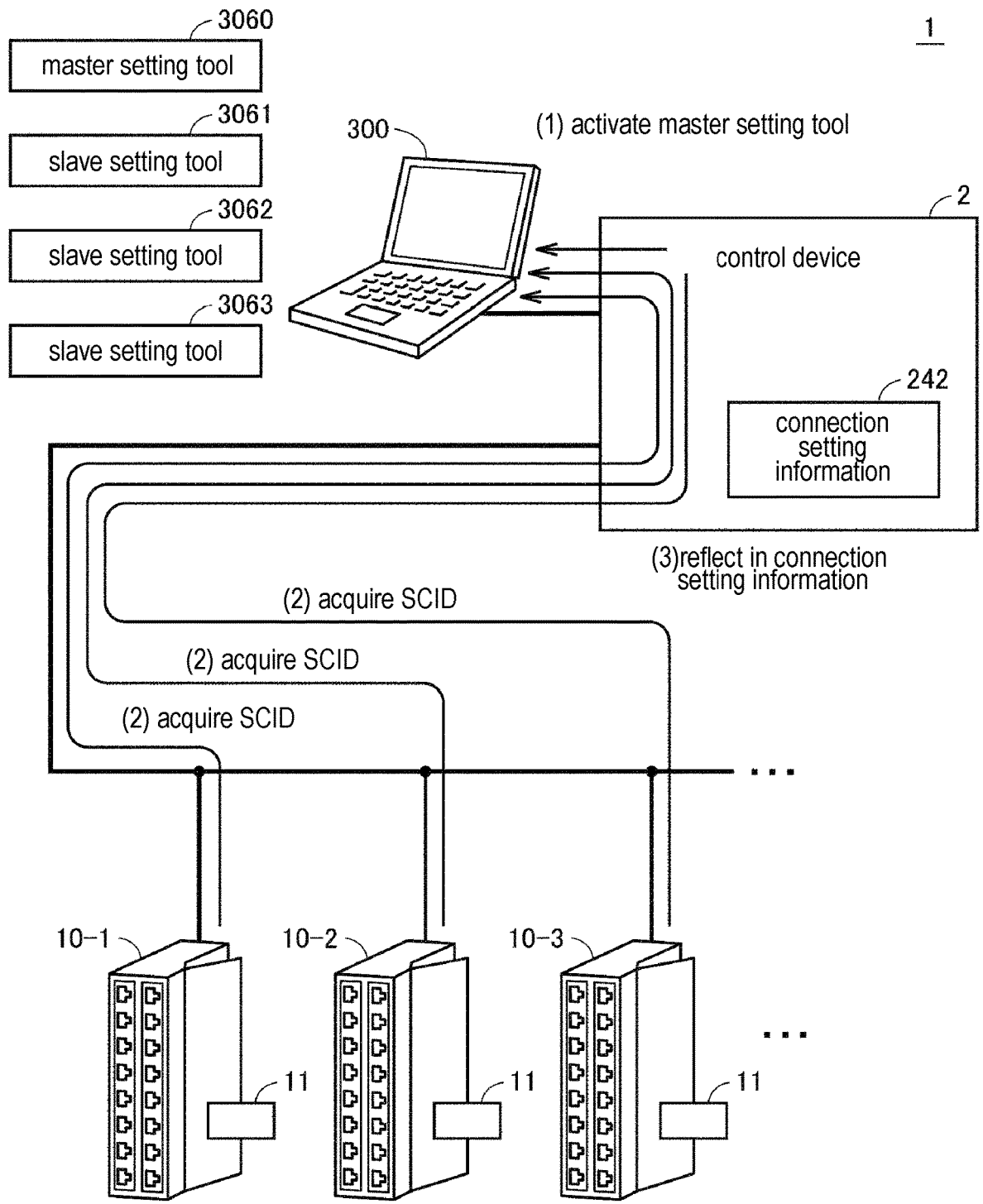
FIG. 1 is a schematic diagram showing a functional configuration example of a safety control system according to an embodiment.

Embodiments of the present invention are described in detail with reference to the drawings. Note that, the same or corresponding parts in the drawings are designated by the same reference signs and the descriptions thereof are not repeated.

§ 1 Application Example

First, an example of a case in which the present invention is applied is described. FIG. 1 is a schematic diagram showing a functional configuration example of a safety control system 1 according to the embodiment. The safety control system 1 according to the embodiment provides an architecture for achieving function safety defined in, for example, IEC 61508 or the like.

The safety control system 1 typically includes a control device 2 that achieves safety control related to function safety, and one or a plurality of safety devices network-connected to the control device 2. In the safety control system 1 exemplified in FIG. 1, the control device 2 is connected to three safety devices 10-1, 10-2, and 10-3 (hereinafter, also collectively referred to as "safety device 10").

In this specification, "standard control" is typically a general term of processing for controlling a control target in accordance with predetermined requirement specifications. In addition, in this specification, "safety control" is a general term of processing for preventing the safety of a human from being threatened by some equipment, machine, or the like due to some failure. The safety control includes, for example, processing of stopping the control target not only when the behavior of the control target is different from the original behavior but also when it is judged that some abnormality has occurred in the control device 2.

In this specification, "device" includes apparatuses capable of being connected via an arbitrary network. The device includes at least a part of a single sensor, a single actuator, a relay apparatus for connecting one or a plurality of sensors or actuators to a network, and various control devices such as a robot controller, a temperature controller, a flow rate controller, and the like. In particular, the "device" for achieving safety control is also referred to as "safety device".

Identification information such as an IP address, a safety network number (SNN), an originator unique network identifier (OUNID), a target unique network identifier (TUNID), a safety configuration identifier (SCID), and the like are used to establish a connection and exchange messages between the control device 2 and the safety device 10.

The IP address is a network address allocated to the control device 2 and each safety device 10. The IP address is set so as not to repeat in the same network.

The SNN is an example of network identification information, and is identification information set in a range in which the control device 2 is handled as a single network. The SNN is set so as not to mutually repeat in each network in the safety control system 1.

The OUNID is identification information for identifying the control device 2. The TUNID is identification information for identifying each safety device 10. Typically, a data string in which the SNN of a network to which each safety device 10 belongs and the IP address of each safety device 10 are combined is used as the TUNID. In this way, the TUNID, which is device identification information, may be determined based on the IP address of a target safety device 10 and the SNN which is network identification information set for the network to which the target safety device 10 belongs.

The SCID is setting identification information that is allocated when required setting is performed on each safety device 10 and identifies the setting (configuration) of each safety device 10. The SCID is used as a signature in the setting (safety setting) of each safety device 10. The SCID is a combination of a safety configuration CRC (SCCRC) and a safety configuration time stamp (SCTS). The SCCRC is a cyclic redundancy check (CRC) for detecting errors that may occur in setting data (configuration data) of the safety device 10. The SCTS is data indicating a date on which the setting data of the safety device 10 is revised, and identifies the revision.

In CIP Safety, which is a communication protocol compatible with a function safety standard such as IEC 61508, "Type 1", "Type 2a", and "Type 2b" are defined as methods for establishing a connection between the control device 2 and the safety device 10.

"Type 1" is an establishment method in which a safety device is set when a connection is established. However, high-functional safety devices such as a controller, a robot, and the like usually do not support Type 1. For a high-functional safety device, a tool for setting is provided separately, and the setting is performed in advance using the tool.

"Type 2a" is an establishment method in which a safety device is not set when a connection is established, and the SCID that identifies the setting performed in advance on the safety device is used to check whether the setting of the safety device is correct. When the SCID held by the control device matches the SCID held by the safety device, the connection is established, and when the SCID held by the control device is different from the SCID held by the safety device, the establishment of the connection fails.

"Type 2b" is an establishment method in which a safety device is not set when a connection is established, and the check using the SCID is also not performed. "Type 2b" cannot detect that the setting of the safety device has been revised, and thus there is a risk that the safety function is impaired. Therefore, "Type 2b" is used, for example, at the time of starting up and adjusting a safety control system.

The safety control system 1 further includes a support device 300 capable of communicating with the control device 2.

The support device 300 assists in the settings for the control device 2 and the safety device 10. Specifically, a master setting tool 3060 and slave setting tools 3061 to 3063 are pre-installed in the support device 300. The master setting tool 3060 is a support program that assists in the setting for the control device 2, and is provided by the manufacturer or the seller of the control device 2. The slave setting tools 3061 to 3063 are support programs that respectively assist in the settings for the safety devices 10-1 to 10-3, and are respectively provided by the manufacturer or the seller of the safety devices 10-1 to 10-3.

A user activates the slave setting tools 3061 to 3063 in the support device 300 and performs necessary operations to thereby set the safety devices 10-1 to 10-3 respectively. When the setting of each of the safety devices 10-1 to 10-3 is completed, a SCID that identifies the setting is allocated. The SCIDs allocated to the settings of the safety devices 10-1 to 10-3 are respectively stored in memory parts 11 of the safety devices 10-1 to 10-3. Moreover, the SCIDs allocated to the settings of the safety devices 10-1 to 10-3 are respectively confirmed on the slave setting tools 3061 to 3063.

The user activates the master setting tool 3060 in the support device 300 and performs necessary operations to thereby set the control device 2. The master setting tool 3060 includes a group of commands for setting connection setting information 242 in the control device 2 in order to establish a connection with the safety device 10 according to the user operation.

As described above, when the safety device 10 is a high-functional device, either "Type 2a" or "Type 2b" can be selected as the establishment method of a connection. When "Type 2a" is selected, the connection between the control device 2 and the safety device 10 is established using the SCID that identifies the setting of the safety device 10. Therefore, the connection setting information 242 corresponding to the safety device 10 for which "Type 2a" is selected includes the SCID that identifies the setting of the safety device 10.

Conventionally, when a connection with the safety device is established according to "Type 2a", the setting according to the following procedures (a) to (c) is performed in advance on the control device.

(a) The user activates the slave setting tool for the safety device and records the SCID that identifies the setting of the safety device on a memo paper or the like.

(b) The user activates the master setting tool for the control device and inputs the SCID recorded in (a).

(c) The support device sets the SCID input in (b) in the connection setting information held by the control device according to the command of the master setting tool.

According to the conventional setting method, the user needs to activate the corresponding slave setting tool and record the SCID for each safety device for which "Type 2a" is selected. Therefore, for the safety device 10 to which a connection is established according to "Type 2a", the setting on the control device is troublesome and complicated. In particular, when multiple safety devices are connected to the same network, it is necessary to perform the above procedure (a) for each of the multiple safety devices, which requires a lot of work of the user. In addition, the SCID is updated every time the setting of the safety device is revised. Therefore, it is necessary to perform the above procedures (a) to (c) every time the setting of the safety device is revised.

In the embodiment, in order to reduce this complicated work, the master setting tool 3060 includes the following command (A) and command (B). The command (A) is a command for acquiring the SCID from the safety device 10 to which a connection is established according to "Type 2a". The command (B) is a command for setting the SCID acquired by executing the command (A) in the connection setting information 242. Besides, the master setting tool 3060 is used to perform the setting according to the following procedures (1) to (3) on the control device.

(1) The user activates the master setting tool 3060 for the control device 2.
(2) The support device 300 acquires the SCID from the safety device 10 by executing the command (A) of the master setting tool 3060. The acquisition of the SCID from the safety device 10 is performed via the control device 2.
(3) The support device 300 executes the command (B) of the master setting tool 3060 to thereby set the SCID acquired by executing the command (A) in the connection setting information 242.

According to the above procedures (1) to (3), the user can save the work of activating the slave setting tool and recording the SCID that identifies the setting of the safety device on a memo paper or the like as in the conventional case. As a result, even when multiple safety devices 10 are connected to the same network, the user can easily set the SCID that identifies the setting of each of the multiple safety devices 10 in the control device 2.

§ 2 Specific Example

Next, a specific example of the safety control system 1 according to the embodiment is described.

A. Configuration Example of Safety Control System

Figure 2:
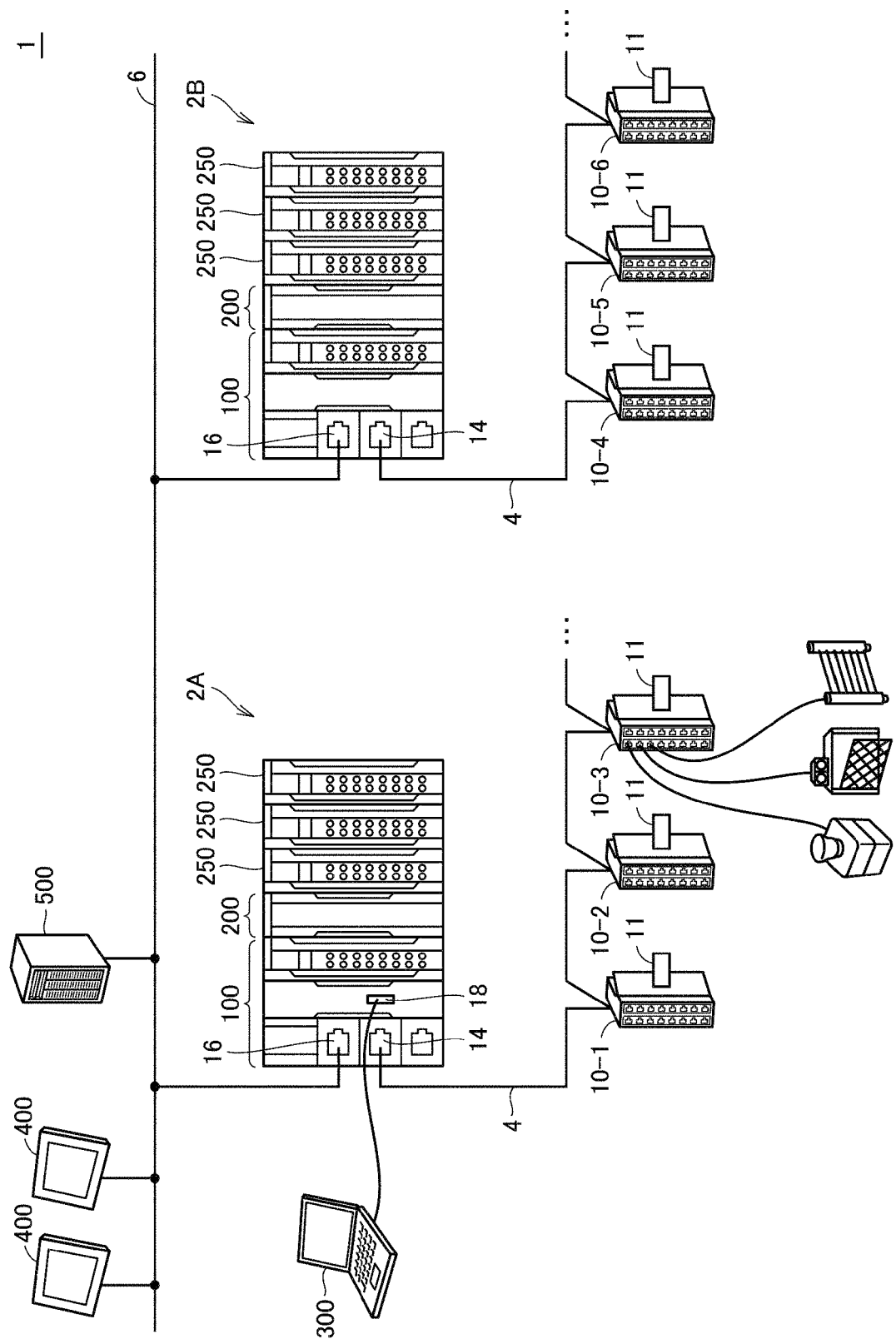
FIG. 2 is a schematic diagram showing a configuration example of the safety control system according to the embodiment.

A configuration example of the safety control system 1 according to the embodiment is described. FIG. 2 is a schematic diagram showing the configuration example of the safety control system according to the embodiment.

In FIG. 2, the safety control system 1 including two control devices 2A and 2B (hereinafter, sometimes collectively referred to as "control device 2") is shown as an example.

The control device 2 is capable of standard control for controlling a control target (not shown) and safety control. Although both the standard control and the safety control may be achieved by the same unit, the control device 2 is configured by a standard control unit 100 mainly in charge of control for the control target and a safety control unit 200 mainly in charge of the safety control. As described later, the standard control is achieved by executing a standard control program in the standard control unit 100, and the safety control is achieved by executing a safety program in the safety control unit 200. One or a plurality of safety IO units 250 may be mounted on the control device 2.

The safety IO unit 250 is responsible for the input of signals from a safety component and/or the output of signals to a safety component. In this specification, the "safety component" mainly includes an arbitrary apparatus used for the safety control, and includes, for example, a safety relay, various safety sensors, and the like.

The standard control unit 100 is communicably connected to the safety control unit 200 and the safety IO unit 250 via an internal bus. In the control device 2 shown in FIG. 2, communication ports 14 and 16 for the connection with another control device 2 or another device are arranged in the standard control unit 100, and the safety control unit 200 uses the standard control unit 100 connected via the internal bus to exchange data with the another control device 2 or another device.

The standard control unit 100 includes the communication port 14 for physical connection with a subordinate network 4, and the communication port 16 for physical connection with a superordinate network 6. As an example, safety devices 10-1, 10-2, 10-3, 10-4, 10-5, 10-6 . . . are connected to the subordinate network 4, and one or a plurality of human machine interfaces (HMI) 400 and a server apparatus 500 are connected to the superordinate network 6. In addition, the control device 2A and the control device 2B are also connected via the superordinate network 6.

The HMI 400 displays state values and the like held by the control device 2 and receives the user operation to output the content of the received user operation to the control device 2.

The server apparatus 500 includes a database for collecting information from the control device 2, an operation management system for giving various settings such as a recipe to the control device 2, and the like.

In FIG. 2, a safety IO device is shown as an example of the safety device 10. The safety IO device is one type of relay apparatus for forming a network for signals exchanged with one or a plurality of safety components (for example, an emergency stop button, a safety switch, a light curtain, and the like). The safety IO device sends out detection signals and the like output from the safety component to the network and outputs instructions transmitted via the network to the target safety component. Moreover, the safety device is not limited to the safety IO device shown in FIG. 2, and any apparatus for achieving function safety can be used.

A protocol related to the data transmission of the subordinate network 4 and the superordinate network 6 may be an industrial network protocol such as EtherNet/IP (registered trademark), DeviceNet (registered trademark), CompoNet (registered trademark), or the like. As described later, a program (application) executed in the standard control unit 100 and/or the safety control unit 200 employs the protocol related to data transmission to achieve data exchange in accordance with a communication protocol such as a common industrial protocol (CIP), CIP Safety, or the like.

That is, the control device 2 may employ an architecture in which an industrial network protocol such as EtherNet/IP (registered trademark), DeviceNet (registered trademark), CompoNet (registered trademark), or the like is combined with a communication protocol (function at an application layer) such as CIP, CIP Safety, or the like.

The description below mainly illustrates the architecture in which the CIP Safety is employed in addition to EtherNet/

IP (registered trademark) between the safety control unit 200 and one or a plurality of safety devices 10.

Each of the safety devices 10 has a memory part 11 for storing information required for establishing a connection with the control device 2. The memory part 11 holds the IP address, the TUNID, the SCID, attribute information, and the like. The attribute information represents the attributes (model, vendor name, product code, state, serial number, product name, and the like) of the safety device 10. The memory part 11 is implemented using a flash memory, a non-volatile RAM (NVRAM), or the like.

The support device 300 is communicable with the control device 2 via a communication port 18. That is, the support device 300 is configured to be capable of communicating with the control device 2 that is network-connected to one or a plurality of safety devices 10. The support device 300 provides the user with functions such as development, debugging, and the like of the program executed in the control device 2 (the standard control unit 100 and/or the safety control unit 200), and provides the user with the function of performing network setting and the like on the safety device 10 which is connected via the subordinate network 4. The setting function provided by the support device 300 is described in detail later.

B. Hardware Configuration Example

Next, hardware configuration examples of main apparatuses constituting the safety control system 1 according to the embodiment are described.

(b1: Standard Control Unit 100)

Figure 3:
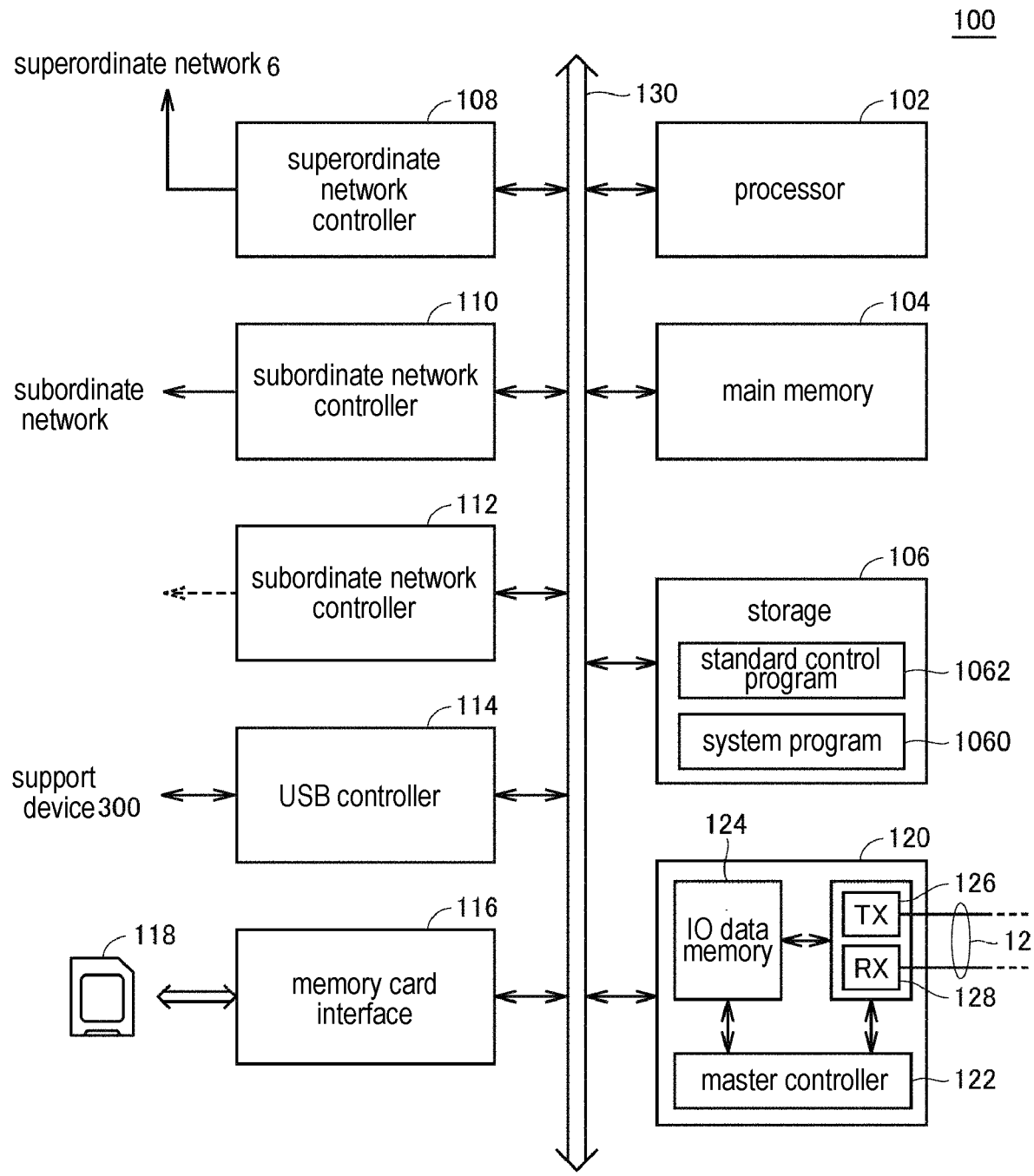
FIG. 3 is a schematic diagram showing a hardware configuration example of a standard control unit constituting a control device according to the embodiment.

FIG. 3 is a schematic diagram showing a hardware configuration example of a standard control unit constituting the control device according to the embodiment. With reference to FIG. 3, the standard control unit 100 includes a processor 102, a main memory 104, a storage 106, a superordinate network controller 108, subordinate network controllers 110 and 112, a universal serial bus (USB) controller 114, a memory card interface 116, and an internal bus controller 120. These components are connected via a processor bus 130.

The processor 102 corresponds to an arithmetic processing part that executes control arithmetic and the like, and is formed of a central processing unit (CPU), a graphics processing unit (GPU), or the like. Specifically, the processor 102 reads out programs (for example, a system program 1060 and a standard control program 1062) stored in the storage 106 and develops the programs in the main memory 104 for execution, thereby achieving the control corresponding to the control target and a variety of processing.

The main memory 104 is formed of a volatile memory apparatus and the like, such as a dynamic random access memory (DRAM) or a static random access memory (SRAM). The storage 106 is formed of, for example, a non-volatile memory apparatus and the like, such as a hard disk drive (HDD) or a solid state drive (SSD).

In the storage 106, in addition to the system program 1060 for achieving basic functions, the standard control program 1062 created according to the control target such as equipment or a machine is stored. Furthermore, the storage 106 stores memory mapping information for relaying the data transmission which is done by the safety control unit 200 and in which the superordinate network controller 108 and/or the subordinate network controllers 110 and 112 are/is employed.

The superordinate network controller 108 exchanges data with an arbitrary information processing apparatus such as another control device 2, the HMI 400, the server apparatus 500, or the like via the superordinate network 6.

The subordinate network controllers 110 and 112 exchange data with devices and/or the safety device 10 via the subordinate network 4. In FIG. 3, two subordinate network controllers 110 and 112 are shown, but it may also be that only one subordinate network controller is adopted.

The USB controller 114 exchanges data with the support device 300 and the like via a USB connection.

The memory card interface 116 receives a memory card 118 which is an example of a detachable recording medium. The memory card interface 116 is capable of writing data into the memory card 118 and reading various data (log, trace data, and the like) out from the memory card 118.

The internal bus controller 120 exchanges data with the safety control unit 200 or the safety IO unit 250 via an internal bus 12. More specifically, the internal bus controller 120 includes a master controller 122, an IO data memory 124, a transmission circuit (TX) 126, and a reception circuit (RX) 128.

The 10 data memory 124 is a memory that temporarily holds data (input data and output data) exchanged with various units via the internal bus 12, and an address is defined in advance in association with each unit. The transmission circuit 126 generates a communication frame including output data and sends out the communication frame to the internal bus 12. The reception circuit 128 receives the communication frame transmitted through the internal bus 12 and demodulates the communication frame into input data. The master controller 122 controls the IO data memory 124, the transmission circuit 126, and the reception circuit 128 according to the data transmission timing and the like on the internal bus 12. The master controller 122 provides the control as a communication master that manages the data transmission and the like on the internal bus 12.

In FIG. 3, a configuration example has been shown in which necessary functions are provided by the processor 102 executing the program. However, a dedicated hardware circuit (for example, an application specific integrated circuit (ASIC), a field-programmable gate array (FPGA), or the like) may be used to implement a part or all of the functions provided. Alternatively, hardware in accordance with a general-purpose architecture (for example, an industrial personal computer based on a general-purpose personal computer) may be used to implement main parts of the standard control unit 100. In this case, a virtualization technology may be used to execute a plurality of operating systems (OSs) having different purposes in parallel, and to execute necessary applications in each OS. Furthermore, a configuration in which the functions of a display device, a support device, and the like are integrated into the standard control unit 100 may be employed.

(b2: Safety Control Unit 200)

Figure 4:
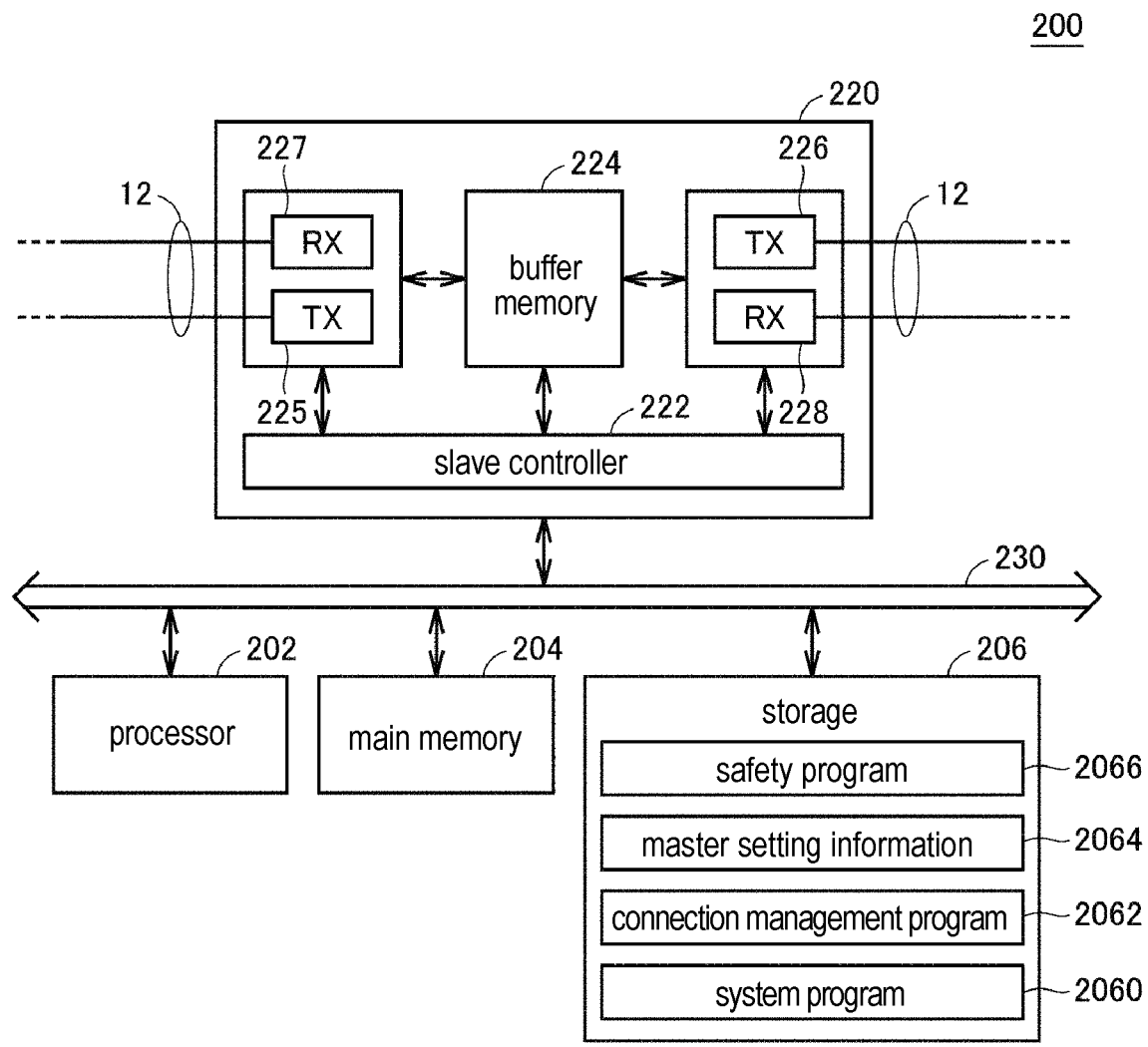
FIG. 4 is a schematic diagram showing a hardware configuration example of a safety control unit constituting the control device according to the embodiment.

FIG. 4 is a schematic diagram showing a hardware configuration example of the safety control unit 200 constituting the control device 2 according to the embodiment. With reference to FIG. 4, the safety control unit 200 includes a processor 202, a main memory 204, a storage 206, and an internal bus controller 220. These components are connected via a processor bus 230.

The internal bus controller 220 functions as a communication slave and provides the same communication interface as those of other units. That is, the internal bus controller 220 exchanges data with the standard control unit 100 and function units via the internal bus 12.

On the internal bus 12, the safety control unit 200 and the safety IO unit 250 are daisy-chained. That is, when the internal bus controller 220 receives a communication frame from an apparatus existing on the upstream side on the internal bus 12, the internal bus controller 220 copies therein all or a part of the data of the communication frame and delivers the data to an apparatus existing on the downstream side. Similarly, when the internal bus controller 220 receives a communication frame from the apparatus existing on the downstream side on the internal bus 12, the internal bus controller 220 copies therein all or a part of the data of the communication frame and delivers the data to the apparatus existing on the upstream side. The data transmission between the standard control unit 100 and the function units and the safety control unit 200 is achieved by this sequential delivery of the communication frame.

More specifically, the internal bus controller 220 includes a slave controller 222, a buffer memory 224, transmission circuits (TX) 225 and 226, and reception circuits (RX) 227 and 228.

The buffer memory 224 temporarily holds the communication frame transmitted through the internal bus 12.

When the reception circuit 227 receives the communication frame transmitted through the internal bus 12, the reception circuit 227 stores all or a part of the communication frame in the buffer memory 224. The transmission circuit 226 sends out the communication frame received by the reception circuit 227 to the internal bus 12 on the downstream side.

Similarly, when the reception circuit 228 receives the communication frame transmitted through the internal bus 12, the reception circuit 228 stores all or a part of the communication frame in the buffer memory 224. The transmission circuit 225 sends out the communication frame received by the reception circuit 228 to the internal bus 12 on the downstream side.

The slave controller 222 controls the transmission circuits 225 and 226, the reception circuits 227 and 228, and the buffer memory 224 in order to achieve the sequential delivery of the communication frame on the internal bus 12.

The processor 202 corresponds to an arithmetic processing part that executes control arithmetic and the like, and is formed of a CPU, a GPU, or the like. Specifically, the processor 202 reads out programs (for example, a system program 2060, a connection management program 2062, and a safety program 2066) stored in the storage 206 and develops the programs in the main memory 204 for execution, thereby achieving the control corresponding to the control target and a variety of processing as described later.

The main memory 204 is formed of a volatile memory apparatus and the like, such as a DRAM or a SRAM. The storage 206 is formed of, for example, a non-volatile memory apparatus and the like, such as a HDD or a SSD.

In the storage 206, in addition to the system program 2060 for achieving basic functions, the connection management program 2062 for establishing and maintaining a connection for data exchange with the safety device 10, master setting information 2064 that includes setting information required for the data exchange with the safety device 10, and the safety program 2066 which is created corresponding to the target safety device 10 are stored. The master setting information 2064 includes the connection setting information 242 for establishing a connection with the safety device 10.

In FIG. 4, a configuration example has been shown in which necessary functions are provided by the processor 202 executing the program. However, a dedicated hardware circuit (for example, an ASIC, a FPGA, or the like) may be used to implement a part or all of the functions provided. Alternatively, hardware in accordance with a general-purpose architecture (for example, an industrial personal computer based on a general-purpose personal computer) may be used to implement main parts of the safety control unit 200.

(b3: Support Device 300)

Figure 5:
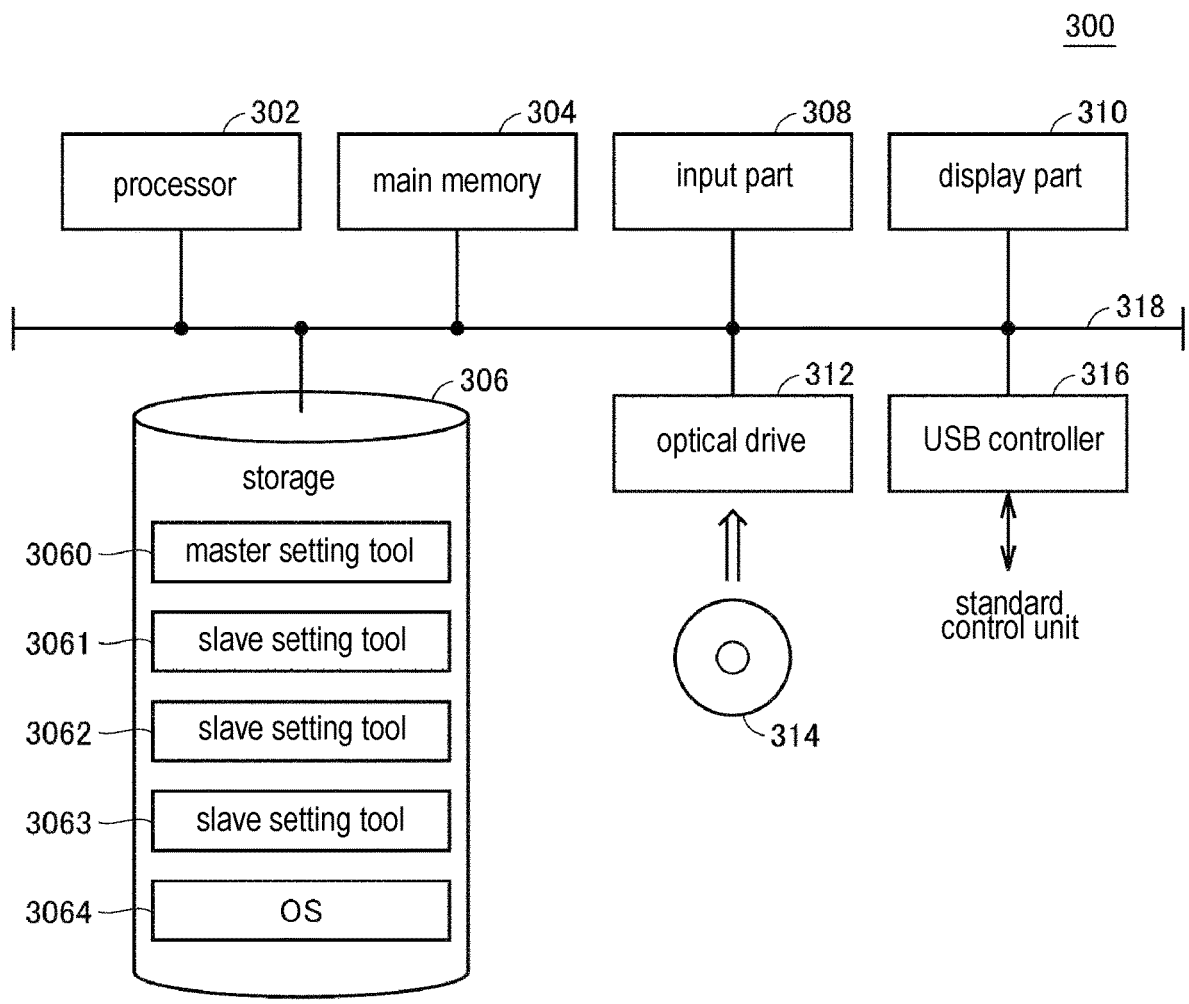
FIG. 5 is a schematic diagram showing a hardware configuration example of a support device connected to the control device according to the embodiment.

FIG. 5 is a schematic diagram showing a hardware configuration example of the support device 300 connected to the control device 2 according to the embodiment. As an example, the support device 300 is implemented by using hardware in accordance with a general-purpose architecture (for example, a general-purpose personal computer) to execute the programs.

With reference to FIG. 5, the support device 300 includes a processor 302, a main memory 304, a storage 306, an input part 308, a display part 310, an optical drive 312, and a USB controller 316. These components are connected via a processor bus 318.

The processor 302 is formed of a CPU and the like, reads out programs (for example, the master setting tool 3060, the slave setting tools 3061 to 3063, and an OS 3064) stored in the storage 306 and develops the programs in the main memory 304 for execution, thereby implementing a variety of processing described later.

The main memory 304 is formed of a volatile memory apparatus and the like, such as a DRAM or a SRAM. The storage 306 is formed of, for example, a non-volatile memory apparatus and the like, such as a HDD or a SSD.

In the storage 306, in addition to the OS 3064 for achieving basic functions, the master setting tool 3060 and the slave setting tools 3061 to 3063 for providing the function as the support device 300 are stored.

The input part 308 is formed of a keyboard, a mouse, or the like, and receives user operations. The display part 310 is formed of a display, various indicators, a printer, and the like, and outputs processing results and the like from the processor 302. The input part 308 and the display part 310 constitute a user interface of the support device 300.

The USB controller 316 controls the data exchange with the standard control unit 100 of the control device 2 and the like via a USB connection.

The support device 300 has the optical drive 312. From a recording medium 314 (for example, an optical recording medium such as a digital versatile disc (DVD)) which stores computer-readable programs in a non-transitory manner, the programs stored therein are read out to be installed in the storage 306 and the like.

The programs executed in the support device 300 may be installed via the recording medium 314 that is computer-readable, or may be installed in a form of being downloaded from a server apparatus and the like on the network. In addition, the function provided by the support device 300 according to the embodiment may also be achieved in a form of employing a part of a module provided by the OS.

In FIG. 5, a configuration example has been shown in which necessary functions as the support device 300 are provided by the processor 302 executing the program. However, a dedicated hardware circuit (for example, an ASIC, a FPGA, or the like) may be used to implement a part or all of the functions provided.

(b4: Others)

The safety IO unit 250 is an example of a function unit connected to the standard control unit 100 via the internal bus 12, and performs the signal input from the safety device 10 and/or the signal output to the safety device 10. Compared with a standard IO unit, the safety IO unit 250 is equipped with signal input/output and signal management functions required for achieving the safety of feedback signals and the like. The hardware configuration of the safety IO unit 250 is publicly known, and thus more detailed description is not performed.

The HMI 400 may employ a hardware configuration mounted as a dedicated machine or employ a hardware configuration in accordance with a general-purpose architecture (for example, an industrial personal computer based on a general-purpose personal computer). When the HMI 400 is implemented by an industrial personal computer based on a general-purpose personal computer, the same hardware configuration as that of the support device 300 as shown in FIG. 5 described above is employed.

As an example, the server apparatus 500 can be implemented using a general-purpose file server or a database server. The hardware configuration of this apparatus is publicly known, and thus more detailed description is not performed.

C. Communication Between Safety Control Unit and Safety Device

Next, the communication between the safety control unit 200 and the safety device 10 is described.

Figure 6:
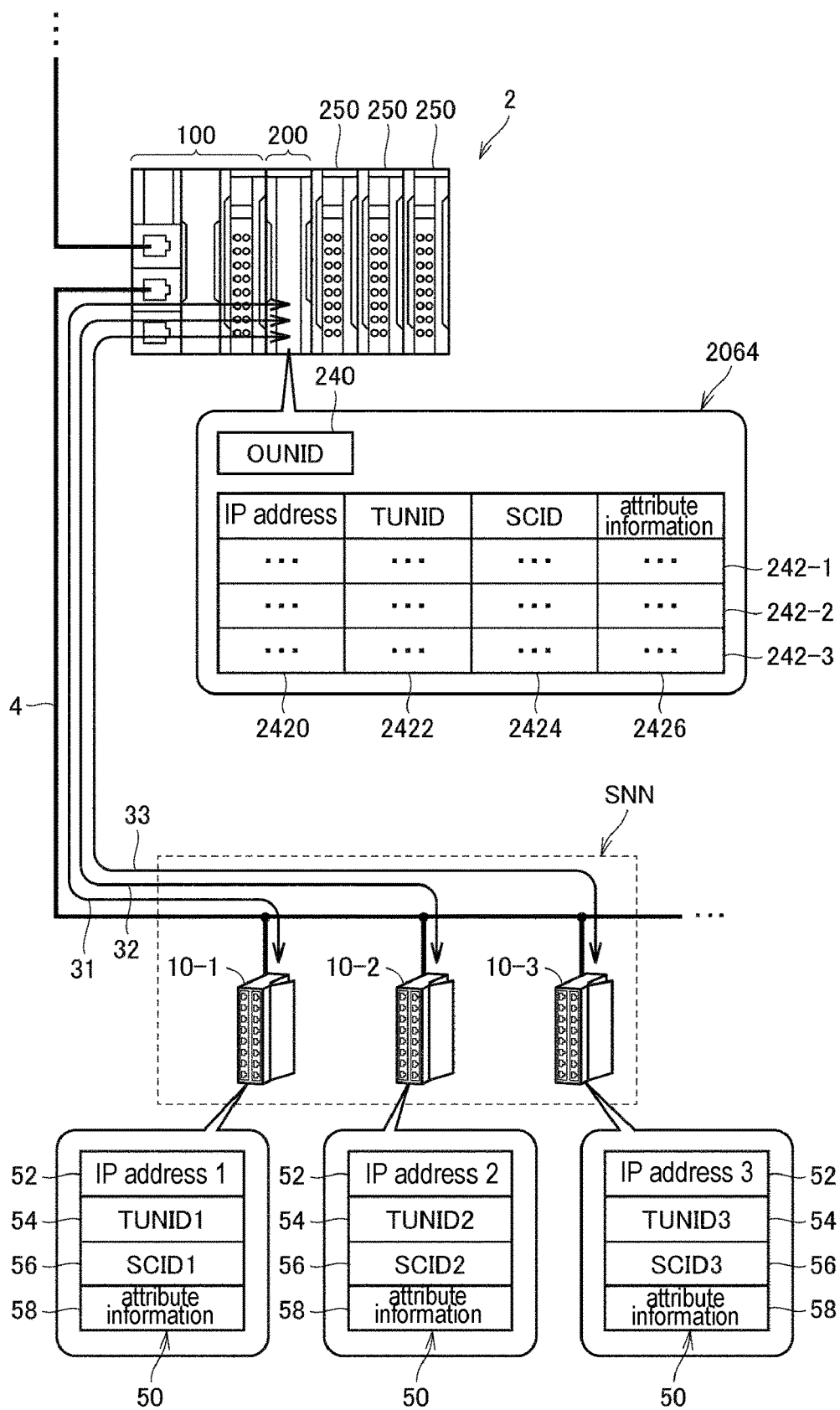
FIG. 6 is a schematic diagram for describing data transmission between the safety control unit and a safety device in the safety control system according to the embodiment.

FIG. 6 is a schematic diagram for describing the data transmission between the safety control unit and the safety device in the safety control system according to the embodiment. With reference to FIG. 6, when acquiring input data from the safety devices 10-1, 10-2, and 10-3, or giving arbitrary output to the safety devices 10-1, 10-2, and 10-3, the safety control unit 200 performs one type of message transmission communication with each of the safety devices 10-1, 10-2, and 10-3.

As shown in FIG. 6, a connection 31 for performing message transmission between the safety control unit 200 and the safety device 10-1, a connection 32 for performing message transmission between the safety control unit 200 and the safety device 10-2, and a connection 33 for performing message transmission between the safety control unit 200 and the safety device 10-3 are respectively established.

The safety control unit 200 functions as a communication master and is also referred to as an "originator". The safety device 10 functions as a communication slave and is also referred to as a "target".

In this kind of message transmission, identification information such as an IP address, a safety network number (SNN), an originator unique network identifier (OUNID), a target unique network identifier (TUNID), a safety configuration identifier (SCID), attribute information, and the like are used in the connection establishment and message exchange.

Each of the safety devices 10-1, 10-2, and 10-3 holds slave setting information 50. The slave setting information 50 includes an IP address 52, a TUNID 54, a SCID 56, and attribute information 58.

The slave setting information 50 is set by the support device 300 (see FIG. 1). For example, the user activates the slave setting tool 3061 (see FIGS. 1 and 5) of the support device 300, and inputs the IP address, the TUNID, and attribute information of the safety device 10-1 in a setting screen displayed by the execution of the slave setting tool 3061. Moreover, because the TUNID is a data string in which the IP address and the SNN are combined, the user may input the SNN instead of the TUNID. The support device 300 determines the input IP address, TUNID, and attribute information as the IP address 52, the TUNID 54, and the attribute information 58 of the slave setting information 50 according to a command of the slave setting tool 3061.

As described above, when the setting of the safety device 10-1 using the slave setting tool 3061 is completed, the SCID 56 is generated by combining the SCCRC corresponding to the setting data and the SCTC which is a time stamp.

The support device 300 sets, in the slave setting information 50 of the safety device 10-1, the determined IP address 52, TUNID 54, and attribute information 58, and the generated SCID 56. In other words, the support device 300 updates the slave setting information 50 of the safety device 10-1 by using the determined IP address 52, TUNID 54, and attribute information 58, and the generated SCID 56.

Similarly, the support device 300 sets the slave setting information 50 of the safety devices 10-2 and 10-3 by the execution of the slave setting tools 3062 and 3063, respectively.

On the other hand, the safety control unit 200 has the master setting information 2064 for performing communication with each safety device 10. The master setting information 2064 includes, in addition to an OUNID 240 which is identification information of the safety control unit 200, connection setting information 242-1 to 242-3 (hereinafter, also collectively referred to as "connection setting information 242").

The connection setting information 242-1 to 242-3 respectively correspond to the safety devices 10-1 to 10-3. The connection setting information 242 includes an IP address 2420, a TUNID 2422, a SCID 2424, and attribute information 2426 of the corresponding safety device 10.

The connection setting information 242 is set by the support device 300. For example, the user activates the master setting tool 3060 (see FIGS. 1 and 5) of the support device 300, and inputs the IP address, TUNID, and attribute information of the safety device 10 in a setting screen displayed by the execution of the master setting tool 3060. Moreover, because the TUNID is a data string in which the IP address and the SNN are combined, the user may input the SNN instead of the TUNID. The support device 300 determines the input IP address, TUNID, and attribute information of the safety device 10 as the IP address 2420, the TUNID 2422, and the attribute information 2426 of the connection setting information 242 according to a command of the master setting tool 3060.

The support device 300 sets the connection setting information 242 of the safety control unit 200 by using the determined IP address 2420, TUNID 2422, and attribute information 2426. In other words, the support device 300 updates the connection setting information 242 of the safety control unit 200 by using the determined IP address 2420, TUNID 2422, and attribute information 2426.

The support device 300 also holds the set IP address 2420, TUNID 2422, and attribute information 2426 therein in correspondence with the safety device 10.

Furthermore, the support device 300 sets the SCID 2424 of the connection setting information 242 according to a command of the master setting tool 3060. The setting method is described later.

Figure 7:
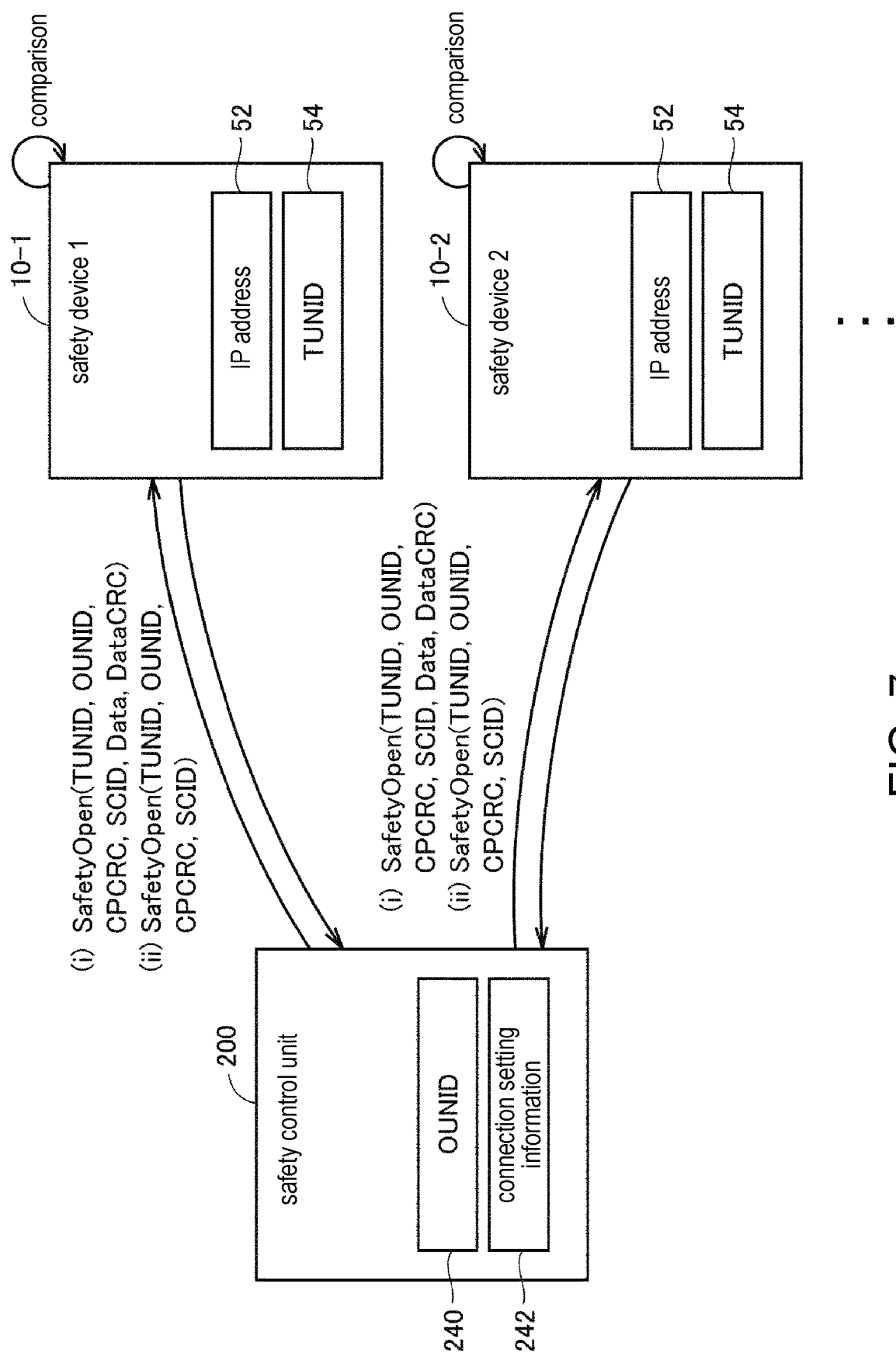
FIG. 7 is a schematic diagram showing a method for establishing a connection between the safety control unit and the safety device in accordance with "Type 2a".

FIG. 7 is a schematic diagram showing a method for establishing a connection between the safety control unit and the safety device in accordance with "Type 2a".

With reference to FIG. 7, for example, the safety control unit 200 sends a message including a command such as "Safety Open" to the safety device 10. The data format of the message includes the OUNID 240 of the safety control unit 200, the TUNID 2422 and the SCID 2424 included in the connection setting information 242 corresponding to the safety device 10, a connection parameters cyclic redundancy check (CPCRC) for checking errors that may occur in the TUNID 2422 and the OUNID 240, entity data (Data), and a data cyclic redundancy check (Data CRC) for checking errors that may occur in the entity data (a case of message (i)).

Alternatively, when there is no entity data to be transmitted, a simplified data format of the message may be employed. The data format includes the OUNID 240 of the safety control unit 200, the TUNID 2422 and the SCID 2424 included in the connection setting information 242 corresponding to the safety device 10, and the CPCRC for checking errors that may occur in the TUNID 2422 and the OUNID 240 (a case of message (ii)).

When receiving the message (i) or (ii) from the safety control unit 200, each safety device 10 compares the message respectively with the TUNID 54 and the SCID 56 of the slave setting information 50 held by the device itself. Then, when the TUNID and the SCID in the message match the TUNID 54 and the SCID 56 in the slave setting information 50 respectively, a judgment is made that the message to the device itself is correctly received, and the connection with the safety control unit 200 is established.

Moreover, when "Type 2b" is selected, the data format of the message with the SCID omitted is employed. In this case, the comparison of the TUNID included in the message with the TUNID 54 in the slave setting information 50 becomes main verification processing.

As described above, in the safety control system 1 according to the embodiment, the safety control unit 200 is required to hold the SCID 2424 which is the same as the SCID 56 set in the safety device 10 to which a connection is established according to "Type 2a".

D. Functional Configuration of Support Device

As described above, the safety control unit 200 and the safety device 10 are required to hold the same SCID in order to establish a connection. The SCID 56 held by the safety device 10 is updated every time the setting of the safety device 10 is revised. Therefore, when the setting of the safety device 10 is revised, the SCID 2424 of the connection setting information 242 held by the safety control unit 200 is also required to be reset.

Figure 8:
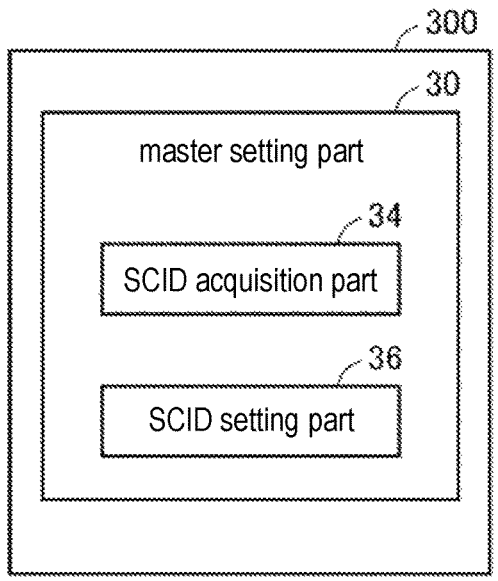
FIG. 8 is a schematic diagram showing an example of a functional configuration of the support device.

FIG. 8 is a schematic diagram showing an example of a functional configuration of the support device. In FIG. 8, a configuration regarding the setting of the SCID 2424 for the safety control unit 200 is shown. As shown in FIG. 8, the support device 300 includes a master setting part 30 that performs the setting of the safety control unit 200. The master setting part 30 is implemented by the processor 302 shown in FIG. 5 executing the master setting tool 3060.

The master setting part 30 displays a setting screen on the display part 310 (see FIG. 5), and performs the setting of the safety control unit 200 according to the input to the input part 308.

Figure 9:
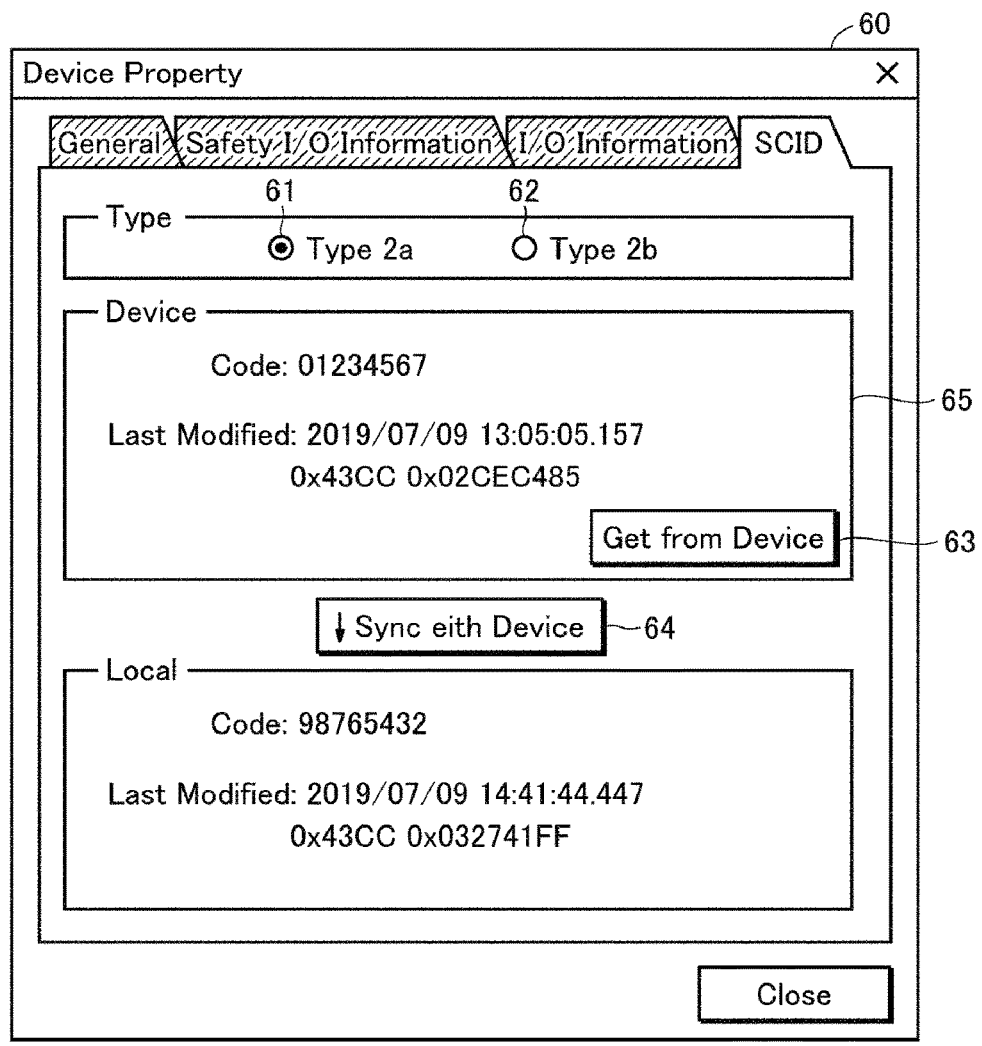
FIG. 9 is a diagram showing an example of a setting screen for setting the safety control unit.

FIG. 9 is a diagram showing an example of the setting screen for setting the safety control unit. A setting screen 60 illustrated in FIG. 9 is a screen for performing the setting regarding the establishment of a connection with the safety device 10. The master setting part 30 displays the setting screen 60 on the display part 310 for each safety device 10 network-connected to the safety control unit 200.

The setting screen 60 includes radio buttons 61 and 62 for selecting the establishment method of the connection. The radio button 61 is a button for selecting "Type 2a", and the radio button 62 is a button for selecting "Type 2b". The user may operate either the radio button 61 or the radio button 62 in accordance with the safety device 10.

The setting screen 60 further includes a button 63 for acquiring the SCID 56 from the safety device 10. The master setting part 30 receives the pressing of the button 63 only when the radio button 61 is operated.

The setting screen 60 further includes a button 64 for setting the SCID 56 acquired from the safety device 10 in the connection setting information 242.

Returning to FIG. 8, the master setting part 30 has a SCID acquisition part 34 and a SCID setting part 36. The SCID acquisition part 34 starts the following processing in response to the pressing of the button 63 on the setting screen 60. The SCID setting part 36 starts the following processing in response to the pressing of the button 64 on the setting screen 60.

The SCID acquisition part 34 acquires the SCID 56 stored in the memory part 11 of the safety device 10. Specifically, the SCID acquisition part 34 generates a command (or a message) for requesting the SCID 56. The command is defined in CIP Safety. The SCID acquisition part 34 acquires the SCID 56 from the safety device 10 by outputting the generated command to the safety device 10 via the safety control unit 200. Alternatively, the SCID acquisition part 34 may instruct the safety control unit 200 to generate and output the command for requesting the SCID 56. The safety control unit 200 acquires the SCID 56 from the safety device 10 and delivers the acquired SCID 56 to the support device 300 according to the instruction.

The SCID acquisition part 34 displays the value of the SCID 56 acquired from the safety device 10 in an area 65 (see FIG. 9) of the setting screen 60.

The SCID setting part 36 determines the SCID 56 acquired from the safety device 10 as the SCID 2424 of the connection setting information 242. The SCID setting part 36 sets the determined SCID 2424 in the connection setting information 242 of the safety control unit 200.

E. Flow of Setting Processing of SCID for Safety Control Unit

Figure 10:
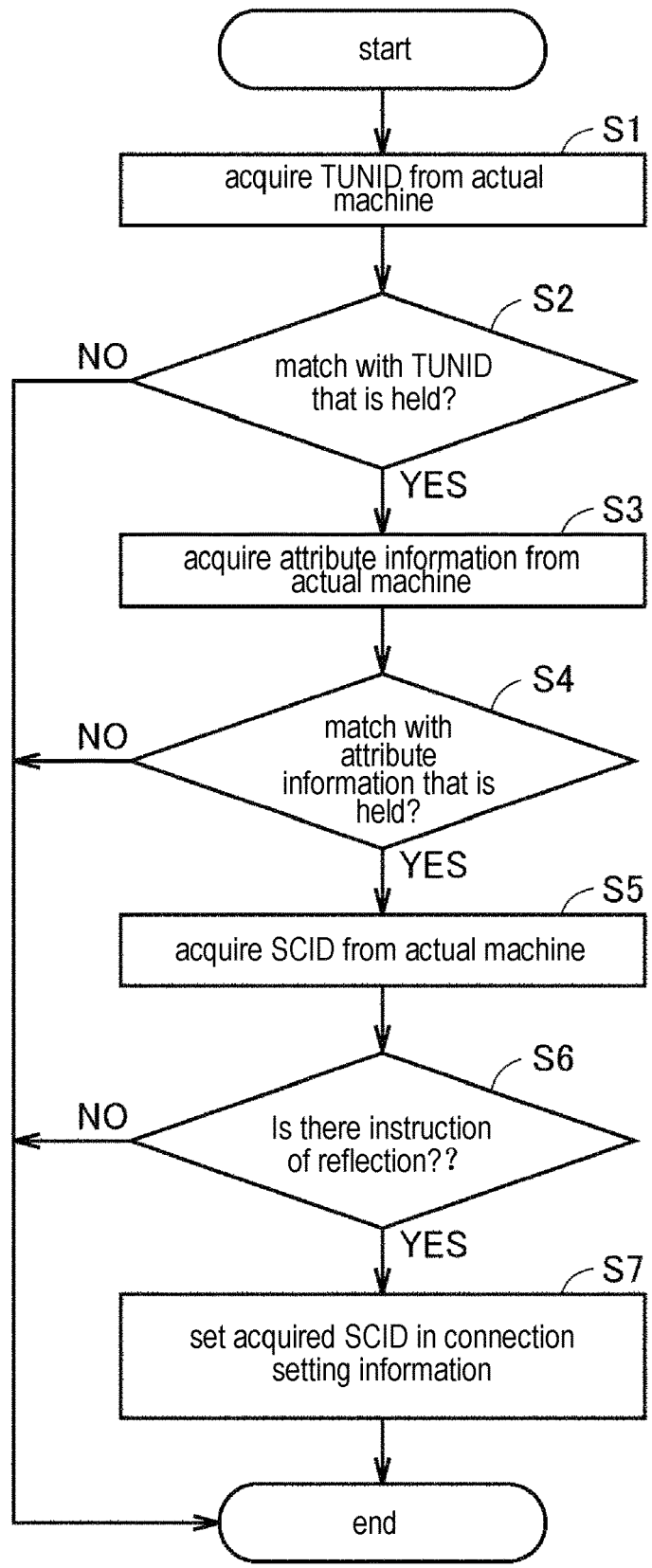
FIG. 10 is a flowchart showing an example of setting processing of a SCID for the safety control unit.

FIG. 10 is a flowchart showing an example of setting processing of the SCID for the safety control unit. Steps S1 to S7 shown in FIG. 10 are executed in response to the pressing of the button 63 on the setting screen 60 shown in FIG. 9. Steps S1 to S7 are executed according to the commands of the master setting tool 3060. Steps S1 to S7 are executed for each safety device 10. Hereinafter, the processing for the safety device 10-1 is described.

The processor 302 executes a command (C) of the master setting tool 3060. The command (C) is a command for acquiring the TUNID 54 from the safety device 10-1 which is an actual machine. The processor 302 acquires the TUNID 54 from the safety device 10-1 by executing the command (C) (step S1). Specifically, the processor 302 generates a command for requesting the TUNID 54, and outputs the generated command to the safety device 10-1 via the safety control unit 200, thereby acquiring the TUNID 54 from the safety device 10-1. The command is defined in CIP. Alternatively, the processor 302 may instruct the safety control unit 200 to generate and output the command for requesting the TUNID 54. The safety control unit 200 acquires the TUNID 54 from the safety device 10-1 and delivers the acquired TUNID 54 to the support device 300 according to the instruction.

Next, the processor 302 executes a command (D) of the master setting tool 3060. The command (D) is a command for comparing the acquired TUNID 54 with the TUNID 2422 held in association with the safety device 10-1. The processor 302 judges whether or not the TUNID 2422 and the TUNID 54 match with each other by executing the command (D) (step S2). As described above, the TUNID 2422 is set in the connection setting information 242-1 according to the command of the master setting tool 3060 and is held in the support device 300. When the TUNID 2422 and the TUNID 54 do not match with each other (NO in step S2), the processor 302 ends the processing.

When the TUNID 2422 and the TUNID 54 match with each other (YES in step S2), the processor 302 executes a command (E) of the master setting tool 3060. The command (E) is a command for acquiring the attribute information 58 from the safety device 10-1 which is an actual machine. The processor 302 acquires the attribute information 58 from the safety device 10-1 by executing the command (E) (step S3). Specifically, the processor 302 generates a command for requesting the attribute information 58, and outputs the generated command to the safety device 10-1 via the safety control unit 200, thereby acquiring the attribute information 58 from the safety device 10-1. The command is defined in CIP. Alternatively, the processor 302 may instruct the safety control unit 200 to generate and output the command for requesting the attribute information 58. The safety control unit 200 acquires the attribute information 58 from the safety device 10-1 and delivers the acquired attribute information 58 to the support device 300 according to the instruction.

Next, the processor 302 executes a command (F) of the master setting tool 3060. The command (F) is a command for comparing the acquired attribute information 58 with the attribute information 2426 held in association with the safety device 10-1. The processor 302 judges whether or not the attribute information 2426 and the attribute information 58 match with each other by executing the command (F) (step S4). As described above, the attribute information 2426 is set in the connection setting information 242-1 according to the command of the master setting tool 3060 and is held in the support device 300. When the attribute information 2426 and the attribute information 58 do not match with each other (NO in step S4), the processor 302 ends the processing.

When the attribute information 2426 and the attribute information 58 match with each other (YES in step S4), the processor 302 acquires the SCID 56 from the safety device 10-1 which is an actual machine by executing the above command (A) of the master setting tool 3060 (step S5). The processor 302 judges whether or not there is an instruction to reflect the acquired SCID 56 in the safety control unit 200 of the control device 2 (step S6). Specifically, the processor 302 judges that there is a reflection instruction in response to the pressing of the button 64 on the setting screen 60. When there is no reflection instruction (NO in step S6), the processor 302 ends the processing.

When there is a reflection instruction (YES in step S6), the processor 302 determines the acquired SCID 56 as the SCID 2424 of the connection setting information 242-1 by executing the above command (B) of the master setting tool 3060. Then, the processor 302 sets the determined SCID 2424 (that is, the acquired SCID 56) in the connection setting information 242-1 (step S7).

F. Modification Example

In the above description, the master setting part 30 displays the setting screen 60 (see FIG. 9) on the display part 310 for each safety device 10, and sets the SCID 2424 of the connection setting information 242 according to the input to the setting screen 60. However, the master setting part 30 may display, on the display part 310, a setting screen for collectively setting the SCID 2424 of the connection setting information 242 corresponding to a plurality of safety devices 10.

Figure 11:
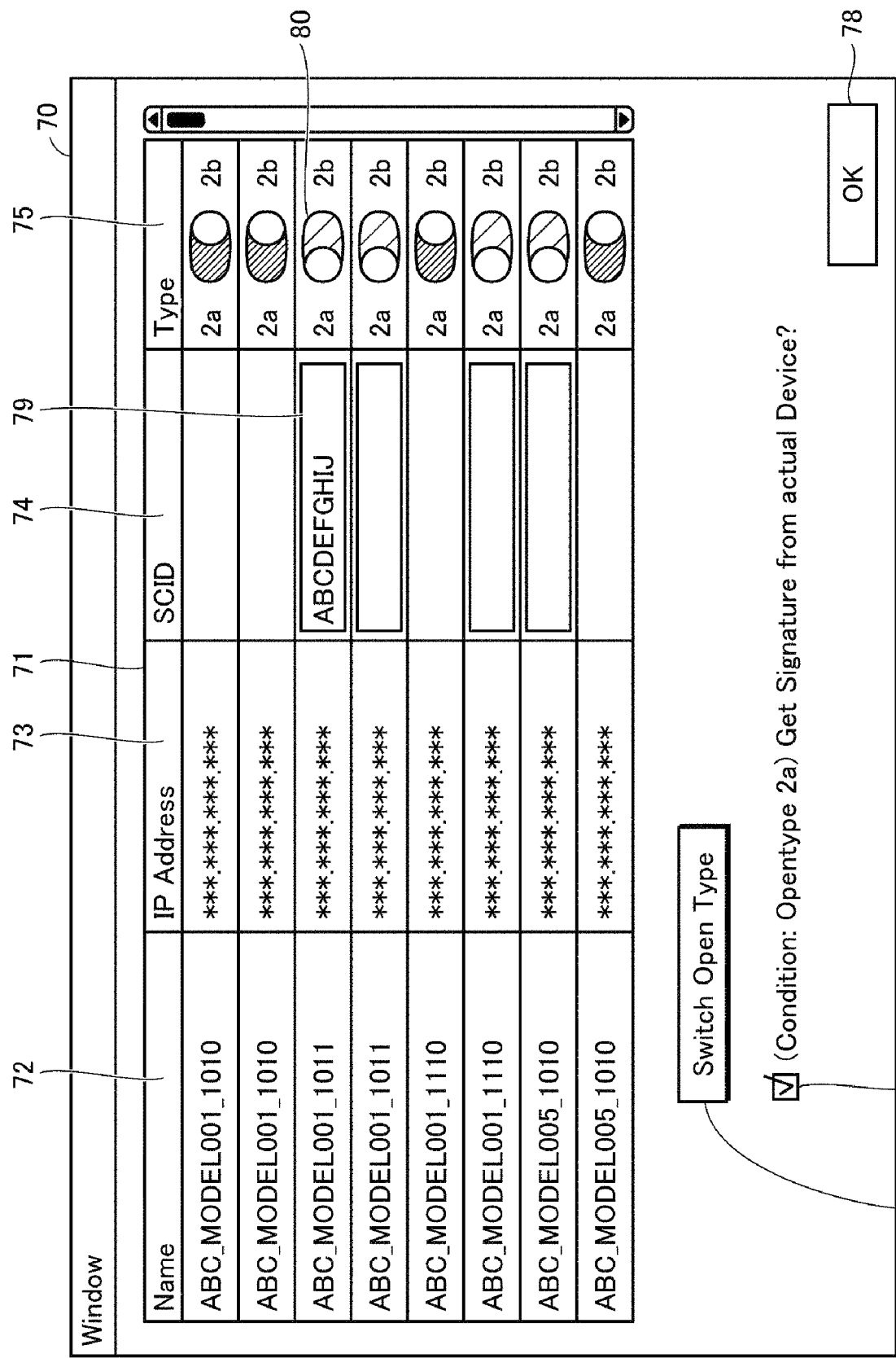
FIG. 11 is a diagram showing another example of the setting screen for setting the safety control unit.

FIG. 11 is a diagram showing another example of a setting screen for setting the safety control unit. A setting screen 70 illustrated in FIG. 11 is a screen for collectively setting the SCID 2424 of the connection setting information 242 corresponding to a plurality of safety devices 10.

The setting screen 70 includes a device list 71 showing a listing of a plurality of safety devices 10 connected to the safety control unit 200. The device list 71 has four columns 72 to 75.

The safety device name is displayed in the column 72. The IP address is displayed in the column 73.

An input field 79 of the SCID is displayed in the column 74. The user can input the SCID in the input field 79.

In the column 75, a switch button 80 for selecting the establishment method of the connection is displayed. The switch button 80 is a button for switching the establishment method of the connection to either "Type 2a" or "Type 2b". The user can switch the establishment method of the connection between each safety device 10 and the safety control unit 200 by operating the switch button 80 for each safety device 10.

In the method of "Type 2b", a check using the SCID is not performed. Therefore, when "Type 2b" is selected in the column 75, the input field 79 is not displayed in the column 74.

Furthermore, the setting screen 70 includes a collective switching button 76, a check box 77, and an OK button 78.

The collective switching button 76 is a button for collectively switching all the switch buttons 80 in the column 75 of the device list 71 to either "Type 2a" or "Type 2b". For example, if the collective switching button 76 is pressed in a state that the switch button 80 indicating "Type 2a" and the switch button 80 indicating "Type 2b" coexist, all the switch buttons 80 in the column 75 are switched to "Type 2a". If the collective switching button 76 is pressed in a state that all the switch buttons 80 in the column 75 indicate "Type 2a", all the switch buttons 80 in the column 75 are switched to "Type 2b". If the collective switching button 76 is pressed in a state that all the switch buttons 80 in the column 75 indicate "Type 2b", all the switch buttons 80 in the column 75 are switched to "Type 2a". Thereby, the user can collectively switch the establishment method of the connection between the plurality of safety devices 10 and the safety control unit 200.

The check box 77 is checked when the SCID 2424 of the connection setting information 242 is automatically set for the safety device 10 in which the switch button 80 is set to "Type 2a".

The OK button 78 is a button for starting the setting of the SCID 2424 to the connection setting information 242 of the safety control unit 200.

In order to save the trouble of inputting the SCID in the input field 79, the user may check the check box 77 and press the OK button 78.

Figure 12:
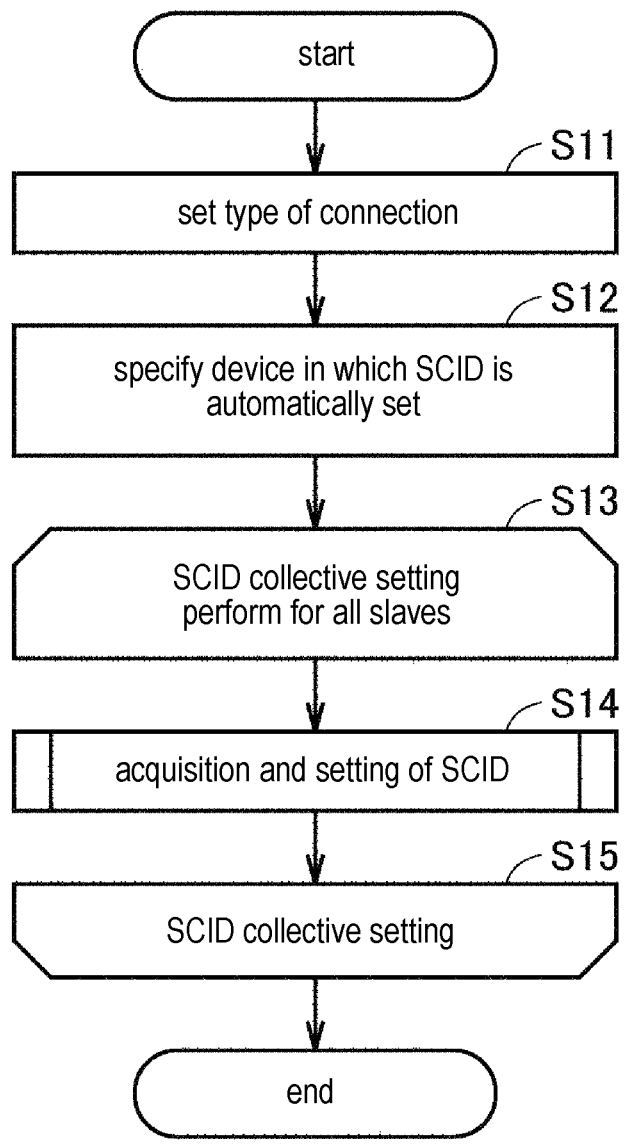
FIG. 12 is a flowchart showing another example of the setting processing of a SCID for the safety control unit.

FIG. 12 is a flowchart showing another example of the setting processing of the SCID for the safety control unit. Steps S11 to S15 shown in FIG. 12 are executed in response to the fact that the OK button 78 is pressed while the check box 77 on the setting screen 70 shown in FIG. 11 is checked.

Steps S11 to S15 are executed according to the commands of the master setting tool 3060.

The processor 302 executes a command (G) of the master setting tool 3060. The command (G) is a command for setting either "Type 2a" or "Type 2b" for each of a plurality of safety devices 10 according to the input to the switch button 80. By executing the command (G), the processor 302 sets either "Type 2a" or "Type 2b" as the establishment method of the connection between each safety device 10 and the safety control unit 200 according to the input to the switch button 80 (step S11).

Next, the processor 302 specifies the safety device 10 for which "Type 2a" has been set as the safety device 10 in which the SCID 2424 is automatically set (step S12). Next, the processor 302 executes a SCID collective setting loop of steps S13 to S15. That is, the processor 302 repeats step S14 for each safety device 10 specified in step S12. The subroutine in step S14 is executed according to the flowchart shown in FIG. 10. However, step S6 is omitted. When step S14 is completed for all the safety devices 10 specified in step S12, the processor 302 ends the processing.

In this way, by merely checking the check box 77 and then pressing the OK button 78, the user can collectively set the SCID 2424 in the connection setting information 242 of the safety control unit 200 for all of the plurality of safety devices 10.

Moreover, the processor 302 may exclude the safety device 10 for which the SCID is input in the input field 79 in step S12. Specifically, the processor 302 may execute a command (H) of the master setting tool 3060 in step S12. The command (H) is a command for classifying, according to whether or not the SCID is input to the input field 79, each safety device 10 for which "Type 2a" is set into either a first group in which the SCID 2424 is automatically set or a second group in which the SCID 2424 is manually set. By executing the command (H), the processor 302 classifies the safety device 10 for which the SCID has not input to the input field 79 into the first group. Then, in step S12, the processor 302 may specify the safety device 10 belonging to the first group as the safety device 10 in which the SCID 2424 is automatically set.

The master setting tool 3060 may also be installed on the HMI 400. Thereby, the user can set the connection setting information 242 of the safety control unit 200 by using the HMI 400.

G. Operation and Effect

As described above, the support device 300 is capable of communicating with the control device 2 network-connected to one or a plurality of safety devices 10. Each of the one or plurality of safety devices 10 holds the setting identification information (the SCID 56) that identifies the setting of the own device. The control device 2 holds, for each of the one or plurality of safety devices 10, the connection setting information 242 set for establishing a connection with the safety device. The one or plurality of safety devices 10 include a target safety device for which "Type 2a" (a first establishment method) has been set, wherein "Type 2a" establishes a connection with the control device 2 in accordance with the result of comparison between the connection setting information 242 and the SCID 56. The support device 300 includes the storage 306 in which the master setting tool 3060 that assists in the setting of the control device 2 is stored, and the processor 302 for executing the master setting tool 3060. The master setting tool 3060 includes the command (A) and the command (B). The command (A) is a command for acquiring the SCID 56 from the target safety device. The command (B) is a command for setting the SCID 56 acquired from the target safety device in response to the execution of the command (A) as the SCID 2424 of the connection setting information 242 corresponding to the target safety device.

According to the above configuration, the user can save the trouble of activating the slave setting tools 3061 to 3063 and recording the SCID 56 for identifying the setting of the safety device on a memo paper or the like as in the conventional case. As a result, even when multiple safety devices 10 are connected to the same network, the user can easily set the SCID that identifies the setting of each of the multiple safety devices 10 in the control device 2.

Each of the one or plurality of safety devices 10 holds the TUNID 54, which is device identification information for identifying the own device. The master setting tool 3060 further includes the command (C) and the command (D). The command (C) is a command for acquiring the TUNID 54 from the target safety device. The command (D) is a command for comparing the TUNID 54 acquired from the target safety device in response to the execution of the command (C) with the TUNID 2422 held in association with the target safety device. The command (A) and the command (B) are executed according to the fact that the comparison result obtained by executing the command (D) shows a match.

According to the above configuration, it is possible to suppress erroneous setting of the SCID in the connection setting information.

Each of the one or plurality of safety devices 10 holds the attribute information 58 representing the attribute of the own device. The master setting tool 3060 further includes the command (E) and the command (F). The command (E) is a command for acquiring the attribute information 58 from the target safety device. The command (F) is a command for comparing the attribute information 58 acquired from the target safety device in response to the execution of the command (E) with the attribute information 2426 held in association with the target safety device. The command (A) and the command (B) are executed according to the fact that the comparison result obtained by executing the command (F) shows a match.

According to the above configuration, it is possible to suppress erroneous setting of the SCID in the connection setting information.

The support device 300 includes the input part 308 and the display part 310, which constitute the user interface. The master setting tool 3060 may further include the command (G) for setting either "Type 2a" or "Type 2b" (a second establishment method) for each of the one or plurality of safety devices 10 according to the input to the input part 308, wherein "Type 2b" establishes a connection with the control device 2 without using the SCID. The target safety device is a safety device for which "Type 2a" has been set by executing the command (G).

According to the above configuration, the command (A) is executed only for the safety device in which the SCID is required for establishing the connection. Thereby, unnecessary communication can be suppressed in the setting of the control device 2.

The master setting tool 3060 may further include the command (H) for classifying, according to the input to the input part 308, each of the one or plurality of safety devices 10 into either the first group in which the SCID is automatically set or the second group in which the connection setting information is manually set. The target safety device is a safety device classified into the first group by executing the command (H).

According to the above configuration, the command (A) is not executed for the safety device in which the SCID is manually set for the controller 2. Thereby, unnecessary communication can be suppressed in the setting of the control device 2.

H. Appendix

As described above, the embodiment includes the following technical ideas.

(Configuration 1)

A support device (300) capable of communicating with a control device (2) network-connected to one or a plurality of safety devices (10), wherein
  each of the one or plurality of safety devices (10) holds setting identification information (56) that identifies the setting of the own device;
  the control device (2) holds, for each of the one or plurality of safety devices (10), connection setting information (242) set for establishing a connection with the safety device (10);
  the one or plurality of safety devices (10) include a target safety device (10) for which a first establishment method has been set, wherein the first establishment method establishes a connection with the control device (2) in accordance with a result of a comparison between the connection setting information (242) and the setting identification information (56);
  the support device (300) includes
  a memory part (306) for storing a support program (3060) that assists in the setting of the control device (2), and
  a processor (302) for executing the support program (3060); and
  the support program (3060) includes
  a first command for acquiring the setting identification information (56) from the target safety device (10), and
  a second command for setting, in the connection setting information (242) corresponding to the target safety device (10), the setting identification information (56) acquired from the target safety device (10) in response to the execution of the first command.

(Configuration 2)

The support device (300) according to Configuration 1, wherein
  each of the one or plurality of safety devices (10) holds device identification information (54) that identifies the own device;
  the support program (3060) further includes
  a third command for acquiring the device identification information (54) from the target safety device (10), and
  a fourth command for comparing the device identification information (54) acquired from the target safety device (10) in response to the execution of the third command with first setting information (2422) held in association with the target safety device (10); and
  the first command and the second command are executed in response to that a comparison result obtained by executing the fourth command shows a match.

(Configuration 3)

The support device (300) according to Configuration 1 or 2, wherein each of the one or plurality of safety devices (10) holds attribute information (58) representing the attribute of the own device;
  the support program (3060) further includes
  a fifth command for acquiring the attribute information (58) from the target safety device (10), and
  a sixth command for comparing the attribute information (58) acquired from the target safety device (10) in response to the execution of the fifth command with second setting information (2426) held in association with the target safety device (10); and
  the first command and the second command are executed in response to that a comparison result obtained by executing the sixth command shows a match.

(Configuration 4)

The support device (300) according to any one of Configurations 1 to 3, wherein the support device (300) includes a user interface (308, 310);
  the support program (3060) further includes
  a seventh command for setting either the first establishment method or a second establishment method for each of the one or plurality of safety devices (10) according to the input to the user interface (308, 310), wherein the second establishment method establishes a connection with the control device (2) without using the setting identification information; and
  the target safety device (10) is a safety device for which the first establishment method has been set by executing the seventh command.

(Configuration 5)

The support device (300) according to any one of Configurations 1 to 3, wherein
  the support device (300) includes a user interface (308, 310);
  the support program (3060) further includes
  an eighth command for classifying, according to the input to the user interface (308, 310), each of the one or plurality of safety devices (10) into either a first group in which the connection setting information (242) is automatically set or a second group in which the connection setting information (242) is manually set; and
  the target safety device (10) is a safety device classified into the first group by executing the eighth command.

(Configuration 6)

A support program (3060), which is executed by a computer (300) capable of communicating with a control device (2) network-connected to one or a plurality of safety devices (10) and assists in the setting of the control device (2), wherein
  each of the one or plurality of safety devices (10) holds setting identification information (56) that identifies the setting of the own device;
  the control device (2) holds, for each of the one or plurality of safety devices (10), connection setting information (242) set for establishing a connection with the safety device (10);
  the one or plurality of safety devices (10) include a target safety device (10) for which a first establishment method has been set, wherein the first establishment method establishes a connection with the control device (2) in accordance with a result of a comparison between the connection setting information (242) and the setting identification information (56); and
  the support program (3060) makes the computer (300) execute
  a step of acquiring the setting identification information (56) from the target safety device (10), and
  a step of setting the setting identification information (56) acquired from the target safety device (10) in the connection setting information (242) corresponding to the target safety device (10).

(Configuration 7)

A setting method of a control device (2) in a support device (300) capable of communicating with the control device (2) network-connected to one or a plurality of safety devices (10), wherein each of the one or plurality of safety devices (10) holds setting identification information (56) that identifies the setting of the own device;

the control device (2) holds, for each of the one or plurality of safety devices (10), connection setting information (242) set for establishing a connection with the safety device (10);

the one or plurality of safety devices (10) include a target safety device (10) for which a first establishment method has been set, wherein the first establishment method establish a connection with the control device (2) in accordance with a result of a comparison between the connection setting information (242) and the setting identification information (56); and the setting method includes a step in which the support device (300) acquires the setting identification information (56) from the target safety device (10), and a step in which the support device (300) sets the setting identification information (56) acquired from the target safety device (10) in the connection setting information (242) corresponding to the safety device (10).

Although the embodiments of the present invention have been described, the embodiments disclosed herein should be considered as exemplary and not restrictive in all respects. The scope of the present invention is indicated by the claims and is intended to include meanings equivalent to the claims and all modifications within scope.

What is claimed is:

1. A support device capable of communicating with a control device network-connected to one or a plurality of safety devices, wherein each of the one or plurality of safety devices holds setting identification information that identifies the setting of the own device;

the control device holds, for each of the one or plurality of safety devices, connection setting information set for establishing a connection with the safety device;

the one or plurality of safety devices include a target safety device for which a first establishment method has been set, wherein the first establishment method establishes a connection with the control device in accordance with a result of a comparison between the connection setting information and the setting identification information;

the support device comprises:

a memory part for storing a support program that assists in the setting of the control device; and a processor for executing the support program; and the support program comprises:

a first command for acquiring the setting identification information from the target safety device; and a second command for setting, in the connection setting information corresponding to the target safety device, the setting identification information acquired from the target safety device in response to the execution of the first command.

2. The support device according to claim 1, wherein each of the one or plurality of safety devices holds device identification information that identifies the own device;

the support program further comprises:

a third command for acquiring the device identification information from the target safety device; and a fourth command for comparing the device identification information acquired from the target safety device in response to the execution of the third command with first setting information held in association with the target safety device; and the first command and the second command are executed in response to that a comparison result obtained by executing the fourth command shows a match.

3. The support device according to claim 1, wherein each of the one or plurality of safety devices holds attribute information representing an attribute of the own device;

the support program further comprises:

a fifth command for acquiring the attribute information from the target safety device; and a sixth command for comparing the attribute information acquired from the target safety device in response to the execution of the fifth command with second setting information held in association with the target safety device; and the first command and the second command are executed in response to that a comparison result obtained by executing the sixth command shows a match.

4. The support device according to claim 1, wherein the support device comprises a user interface;

the support program further comprises a seventh command for setting either the first establishment method or a second establishment method for each of the one or plurality of safety devices according to an input to the user interface, wherein the second establishment method establishes a connection with the control device without using the setting identification information; and the target safety device is a safety device for which the first establishment method has been set by executing the seventh command.

5. The support device according to claim 1, wherein the support device comprises a user interface;

the support program further comprises an eighth command for classifying, according to an input to the user interface, each of the one or plurality of safety devices into either a first group in which the connection setting information is automatically set or a second group in which the connection setting information is manually set; and the target safety device is a safety device classified into the first group by executing the eighth command.

6. A non-transitory computer-readable recording medium, recording a support program, which is executed by a computer capable of communicating with a control device network-connected to one or a plurality of safety devices and assists in the setting of the control device, wherein each of the one or plurality of safety devices holds setting identification information that identifies the setting of the own device;

the control device holds, for each of the one or plurality of safety devices, connection setting information set for establishing a connection with the safety device;

the one or plurality of safety devices include a target safety device for which a first establishment method has been set, wherein the first establishment method establishes a connection with the control device in accordance with a result of a comparison between the connection setting information and the setting identification information; and the support program makes the computer execute:

a step of acquiring the setting identification information from the target safety device; and a step of setting the setting identification information acquired from the target safety device in the connection setting information corresponding to the target safety device.

7. A setting method of a control device in a support device capable of communicating with the control device network-connected to one or a plurality of safety devices, wherein each of the one or plurality of safety devices holds setting identification information that identifies the setting of the own device;

the control device holds, for each of the one or plurality of safety devices, connection setting information set for establishing a connection with the safety device;

the one or plurality of safety devices include a target safety device for which a first establishment method has been set, wherein the first establishment method establishes a connection with the control device in accordance with a result of a comparison between the connection setting information and the setting identification information; and the setting method comprises:

a step in which the support device acquires the setting identification information from the target safety device; and a step in which the support device sets the setting identification information acquired from the target safety device in the connection setting information corresponding to the safety device.

8. The support device according to claim 2, wherein each of the one or plurality of safety devices holds attribute information representing an attribute of the own device;

the support program further comprises:

a fifth command for acquiring the attribute information from the target safety device; and a sixth command for comparing the attribute information acquired from the target safety device in response to the execution of the fifth command with second setting information held in association with the target safety device; and the first command and the second command are executed in response to that a comparison result obtained by executing the sixth command shows a match.

9. The support device according to claim 2, wherein the support device comprises a user interface;

the support program further comprises a seventh command for setting either the first establishment method or a second establishment method for each of the one or plurality of safety devices according to an input to the user interface, wherein the second establishment method establishes a connection with the control device without using the setting identification information; and the target safety device is a safety device for which the first establishment method has been set by executing the seventh command.

10. The support device according to claim 3, wherein the support device comprises a user interface;

the support program further comprises a seventh command for setting either the first establishment method or a second establishment method for each of the one or plurality of safety devices according to an input to the user interface, wherein the second establishment method establishes a connection with the control device without using the setting identification information; and the target safety device is a safety device for which the first establishment method has been set by executing the seventh command.

11. The support device according to claim 8, wherein the support device comprises a user interface;

the support program further comprises a seventh command for setting either the first establishment method or a second establishment method for each of the one or plurality of safety devices according to an input to the user interface, wherein the second establishment method establishes a connection with the control device without using the setting identification information; and the target safety device is a safety device for which the first establishment method has been set by executing the seventh command.

12. The support device according to claim 2, wherein the support device comprises a user interface;

the support program further comprises an eighth command for classifying, according to an input to the user interface, each of the one or plurality of safety devices into either a first group in which the connection setting information is automatically set or a second group in which the connection setting information is manually set; and the target safety device is a safety device classified into the first group by executing the eighth command.

13. The support device according to claim 3, wherein the support device comprises a user interface;

the support program further comprises an eighth command for classifying, according to an input to the user interface, each of the one or plurality of safety devices into either a first group in which the connection setting information is automatically set or a second group in which the connection setting information is manually set; and the target safety device is a safety device classified into the first group by executing the eighth command.

14. The support device according to claim 8, wherein the support device comprises a user interface;

the support program further comprises an eighth command for classifying, according to an input to the user interface, each of the one or plurality of safety devices into either a first group in which the connection setting information is automatically set or a second group in which the connection setting information is manually set; and the target safety device is a safety device classified into the first group by executing the eighth command.

* * * * *